(12) United States Patent
Takeda et al.

(10) Patent No.: US 12,279,264 B2
(45) Date of Patent: Apr. 15, 2025

(54) UCI FEEDBACK ENHANCEMENT FOR INTER-BAND UPLINK CARRIER AGGREGATION

(71) Applicant: QUALCOMM Incorporated, San Diego, CA (US)

(72) Inventors: Kazuki Takeda, Tokyo (JP); Peter Gaal, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 17/804,968

(22) Filed: Jun. 1, 2022

(65) Prior Publication Data

US 2023/0397211 A1    Dec. 7, 2023

(51) Int. Cl.
*H04W 72/21* (2023.01)
*H04L 5/00* (2006.01)
*H04W 52/34* (2009.01)
*H04W 52/36* (2009.01)
*H04W 72/0453* (2023.01)

(52) U.S. Cl.
CPC ............. *H04W 72/21* (2023.01); *H04L 5/001* (2013.01); *H04W 52/346* (2013.01); *H04W 52/367* (2013.01); *H04W 72/0453* (2013.01)

(58) Field of Classification Search
CPC . H04W 72/21; H04W 52/346; H04W 52/367; H04W 72/0453; H04L 5/001; H04L 5/0053

USPC .......................................................... 370/329
See application file for complete search history.

(56) References Cited

U.S. PATENT DOCUMENTS

| | | | |
|---|---|---|---|
| 2020/0287695 A1* | 9/2020 | Wu | H04W 72/0446 |
| 2021/0045143 A1* | 2/2021 | Ji | H04L 5/0044 |
| 2021/0274488 A1* | 9/2021 | Yamamoto | H04L 5/0055 |
| 2021/0352655 A1* | 11/2021 | Xiong | H04W 72/0453 |
| 2022/0158775 A1* | 5/2022 | Xiong | H04W 74/004 |
| 2022/0159729 A1* | 5/2022 | Xiong | H04W 72/1268 |

* cited by examiner

*Primary Examiner* — Mang Hang Yeung
(74) *Attorney, Agent, or Firm* — Arent Fox, LLP

(57) ABSTRACT

Aspects are provided which allow a UE to apply power-efficient UCI multiplexing rules accounting for situations in which CCs of overlapping PUCCH and PUSCH are in different carrier groups during inter-band CA to result in improved transmission performance. The UE transmits UCI in a PUCCH in a first CC in response to the PUCCH overlapping in time with a PUSCH in a second CC and the first CC being associated with a different carrier group than the second CC. Alternatively, the UE transmits UCI in the PUSCH in the second CC in response to the PUCCH overlapping in time with the PUSCH and the first CC being associated with a same carrier group as the second CC. Furthermore, the UE may apply a diversity scheme for UCI transmissions to achieve improved reliability of UCI feedback. The UE may also indicate which carrier includes UCI based on different DMRS configurations.

30 Claims, 16 Drawing Sheets

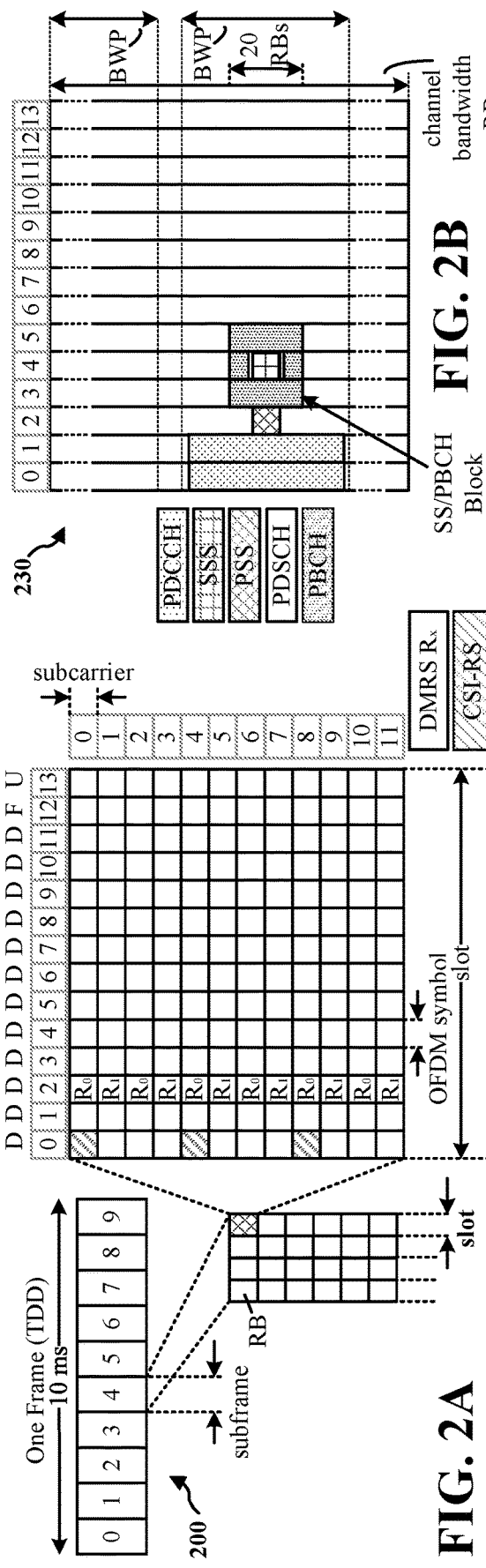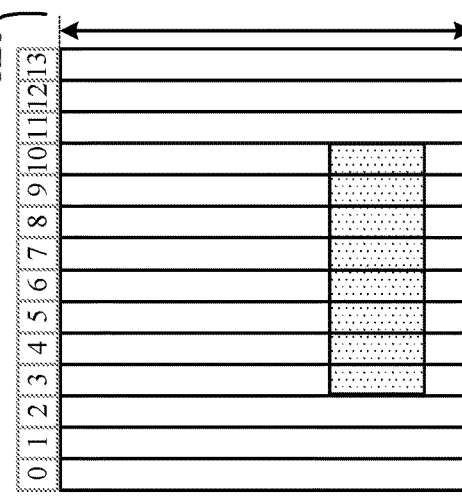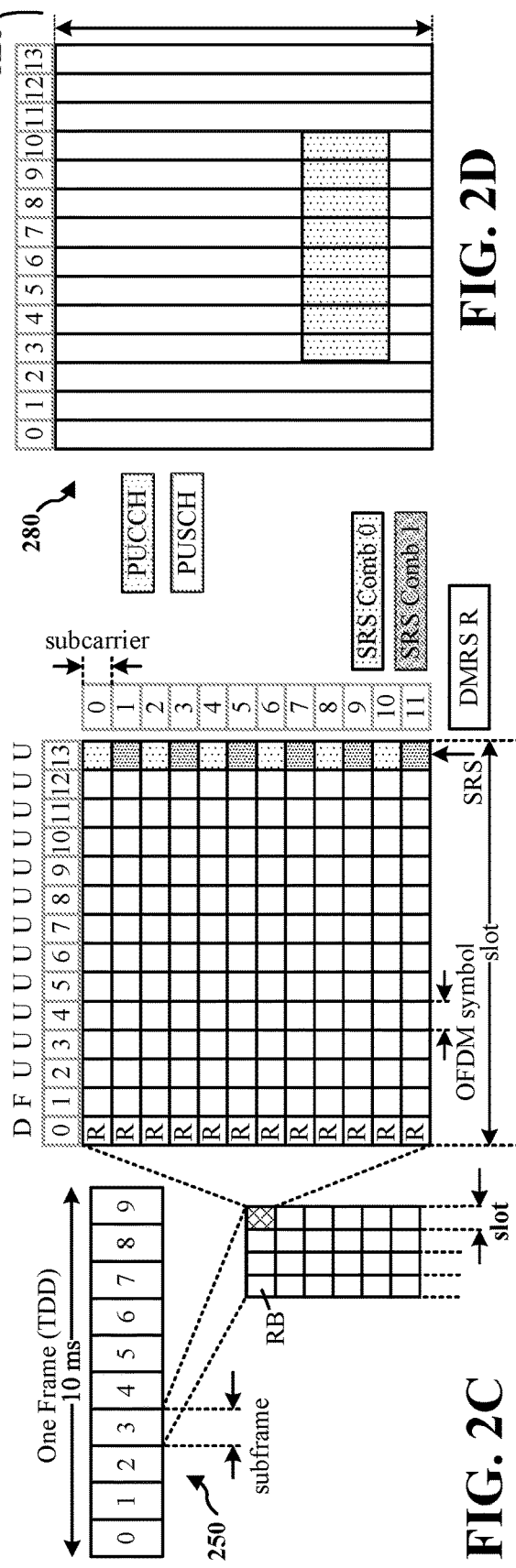
FIG. 2A  FIG. 2B  FIG. 2C  FIG. 2D

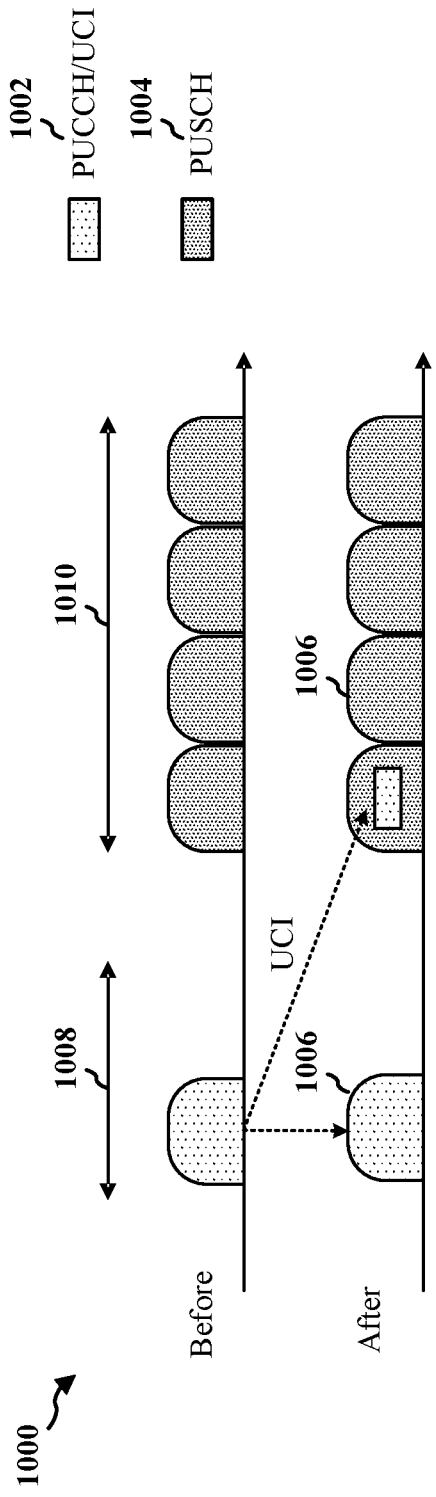
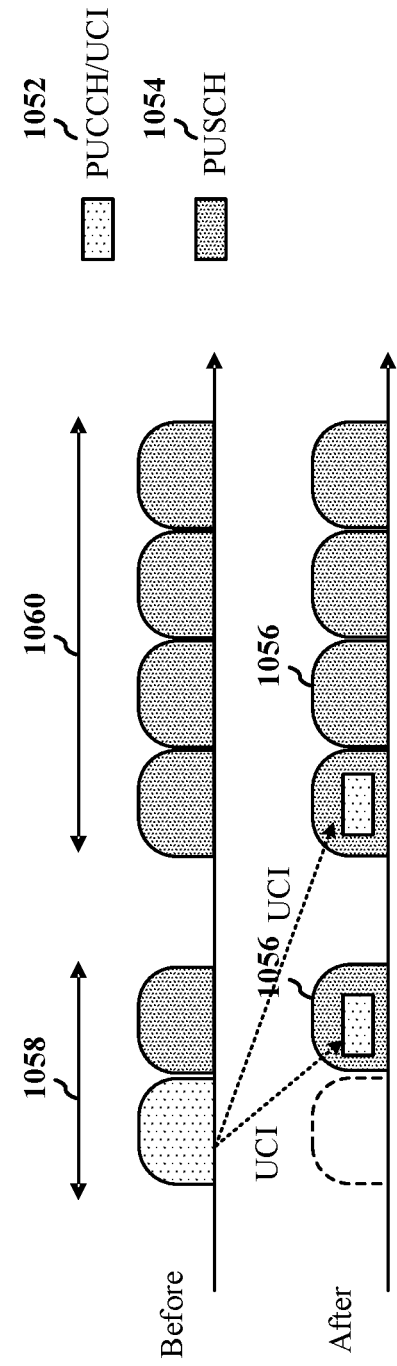
FIG. 10A
FIG. 10B

UCI FEEDBACK ENHANCEMENT FOR INTER-BAND UPLINK CARRIER AGGREGATION

BACKGROUND

Technical Field

The present disclosure generally relates to communication systems, and more particularly, to a wireless communication system between a user equipment (UE) and a base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The apparatus includes a processor; memory coupled with the processor; and instructions stored in the memory and operable, when executed by the processor, to cause the apparatus to: transmit uplink control information (UCI) in a physical uplink control channel (PUCCH) in a first component carrier or a physical uplink shared channel (PUSCH) in a second component carrier. The apparatus transmits the UCI in the PUCCH in the first component carrier in response to the PUCCH overlapping in time with the PUSCH and the first component carrier being associated with a different carrier group than the second component carrier. Alternatively, the apparatus transmits the UCI in the PUSCH in the second component carrier in response to the PUCCH overlapping in time with the PUSCH and the first component carrier being associated with a same carrier group as the second component carrier.

In an aspect of the disclosure, a method, a computer-readable medium, and an apparatus are provided. The apparatus may be a network entity. The apparatus includes a processor; memory coupled with the processor; and instructions stored in the memory and operable, when executed by the processor, to cause the apparatus to: receive UCI in a PUCCH in a first component carrier or a PUSCH in a second component carrier. The apparatus receives the UCI in the PUCCH in the first component carrier in response to the PUCCH overlapping in time with the PUSCH and the first component carrier being associated with a different carrier group than the second component carrier. Alternatively, the apparatus receives the UCI in the PUSCH in the second component carrier in response to the PUCCH overlapping in time with the PUSCH and the first component carrier being associated with a same carrier group as the second component carrier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 10A-10B are diagrams illustrating examples respectively of different UCI multiplexing rules applied in inter-band carrier aggregation as in FIGS. 8A-8B, but further incorporating a diversity scheme for UCI transmissions.

DETAILED DESCRIPTION

Figure 1:
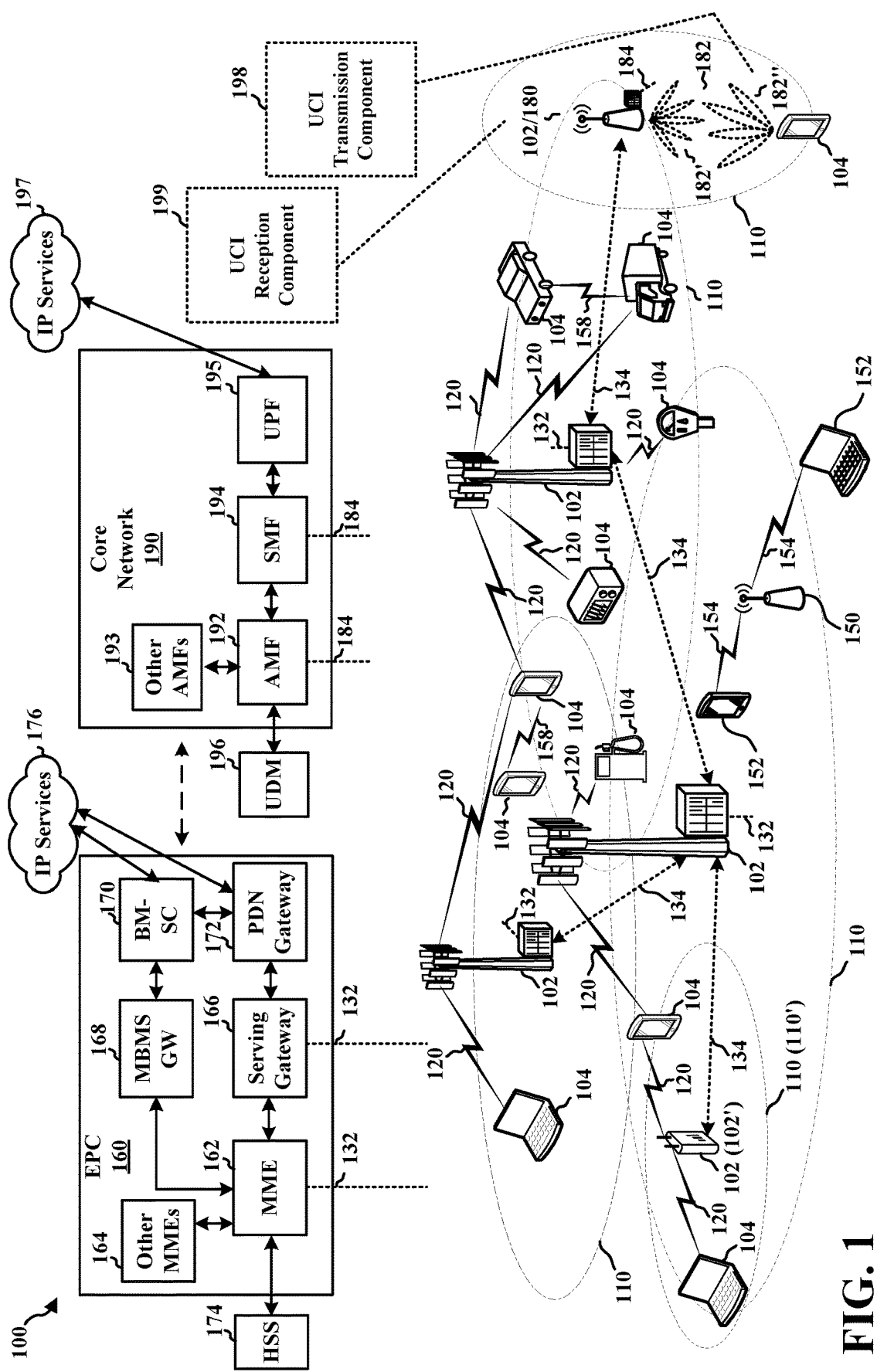
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In carrier aggregation (CA), two or more component carriers (CCs) may be aggregated in order to support wider transmission bandwidths. Aggregation may be arranged using contiguous CCs within the same operating frequency band (e.g. intra-band contiguous CA), using non-contiguous CCs within the same operating frequency band but with gaps in between (e.g. intra-band non-contiguous CA), and using CCs within different operating frequency bands (e.g. inter-band CA). In DL carrier aggregation, a base station transmits downlink data in multiple CCs to a UE, while in UL carrier aggregation, a UE transmits uplink data in multiple CCs to the base station. UE transmission (Tx) power is a much desired resource in UL carrier aggregation.

However, UL Tx power may be limited across UL CCs. For example, UL transmission power may be constrained within a total UL Tx power limit for carrier aggregation. This power limit is generally applied to prevent an unacceptably high level of radiation exposure from UL transmissions through, for example, compliance with specific absorption rate (SAR) limits. Moreover, this power limit is based on UE hardware limits (e.g., shared power amplifiers (PA) among UL CCs). However, for a UE that supports UL transmissions in multiple frequency bands such as in inter-band CA, each of these frequency bands may provide increased transmit power potential for the UE. Moreover, UL transmissions may use different PAs in different frequency bands, and thus UL CCs across frequency bands may have different associated power limits or power classes.

As a result, for certain inter-band CA (e.g., inter-band CA where the UE has different PAs for multiple frequency bands), a UE with a certain power class for each frequency band may be able to transmit data with higher total UE Tx power than the power class for any of the frequency bands. To achieve a short-term higher total UE Tx power while meeting long-term SAR requirements, a UE may dynamically apply uplink power aggregation for its CCs across frequency bands. For instance, the UE may aggregate a configured maximum output power for uplink transmissions in each frequency band to achieve a total available short term, peak transmission power for its UL CCs. This aggregation of UL Tx power for inter-band CA may not be long term due to SAR constraints. For instance, to achieve the benefits of dynamic UL power aggregation in inter-band CA without being constrained by the power limit across frequency bands, the UE may shorten its duty cycle (or reduce the amount of time the UL power aggregation occurs) to avoid exceeding SAR limits.

However, even though uplink power aggregation may be realized in inter-band CA for shorter duty cycles notwithstanding the aforementioned power limit, conventional UCI multiplexing rules still take this power limit into account. For instance, while the UE generally transmits UCI in PUCCH on a primary cell, if a circumstance occurs where the UCI in PUCCH overlaps in time with data in one or more PUSCHs in a same or different CC(s), the UE saves Tx power by dropping the PUCCH transmission including UCI and instead multiplexing the UCI with uplink data in one of the PUSCHs instead. As a result, by dropping the PUCCH transmission including UCI in such circumstance, the UE may divert the Tx power that otherwise would have been utilized for PUCCH instead for the PUSCH transmission, thus remaining within the power limit. While the power benefit of this conventional UCI multiplexing rule is apparent for intra-band CA where the CC(s) including the PUCCH and PUSCH are typically in a same carrier group associated with a same PA, this rule is not efficient for inter-band CA where the CCs including the PUCCH and PUSCH may be in different carrier groups associated with different PAs.

Accordingly, the UE may apply different UCI multiplexing rules in inter-band UL CA compared to intra-band CA in order to account for situations in which the CCs of PUCCH and PUSCH are in different carrier groups (or associated with different PAs). In contrast, for situations where the PUCCH and PUSCH CCs are in a same carrier group (or associated with the same PAs), the UE may apply similar UCI multiplexing rules to those irrespective of carrier groups or PAs. For example, if the UCI in PUCCH overlaps with uplink data in one or more PUSCH in a same carrier group as the PUCCH (or associated with the same PA as the PUCCH, notwithstanding whether the PUCCH and PUSCH (s) are in same or different carriers or frequency bands), the UE may multiplex the UCI in PUSCH and drop the PUCCH transmission in order to maximize Tx power of the PUSCH. However if a PUCCH overlaps with one or more PUSCHs in carriers of different carrier groups associated with different PAs, the aforementioned power limiting is no longer beneficial and therefore the UCI may be transmitted in PUCCH to maximize the Tx power of the UCI.

As a result, the UE may adjust transmissions of overlapping UCI and uplink data according to different UCI multiplexing rules based on carrier groups or PA associations for improved performance. Furthermore, the UE may apply a diversity scheme for UCI transmissions to address any significant power reductions that generally may be applied to a UCI carrier to meet SAR or maximum permissible exposure (MPE) limits. For instance, if the UE aggregates a PUCCH carrier in one frequency band with a PUSCH carrier in another frequency band, then not only may the UE transmit the UCI in PUCCH in one frequency band as previously described, but the UE may also multiplex the UCI with uplink data in PUSCH in the other frequency band if this PUSCH carrier is in a different carrier group associated with a different PA than the PUCCH carrier. As a result, additional diversity gain may be achieved with minimized performance degradation as well as improved reliability of UCI feedback.

Alternatively, if the power reduction applied to a cell including a UCI carrier happens to be sufficiently large to the point where the transmission power of the UCI in that carrier would be reduced by a threshold amount or ratio resulting in significant degradation of the transmission, the base station may allow or instruct the UE to drop the UCI transmission in that carrier. In such case where the UE drops the UCI transmission in a given PUSCH carrier, the UE may instead multiplex this UCI with uplink data in any other PUSCH carrier in a different cell. For example, the UE may determine to transmit UCI in whichever PUSCH carrier has the smallest power backoff in the different cell. Moreover, the UE may utilize DMRS to inform the base station as to which PUSCH carrier actually includes the UCI to assist the base station in successfully decoding the PUSCH data. For instance, the UE may indicate the PUSCH carrier in which the UE determines to carry UCI by applying a specific DMRS group to the DMRS in that carrier, a specific DMRS sequence to the DMRS in that carrier, a specific DMRS pattern to the DMRS in that carrier, or a combination of the foregoing. As a result, rather than diversifying UCI for protection against power backoff as previously described, the UE may choose and indicate which carrier to transmit UCI based on different DMRS configurations to protect from significant transmission degradations caused by such power backoff.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a UCI transmission component 198 that is configured to transmit UCI in a PUCCH in a first component carrier or a PUSCH in a second component carrier. The UCI transmission component 198 may be configured to transmit the UCI in the PUCCH in the first component carrier in response to the PUCCH overlapping in time with the PUSCH and the first component carrier being associated with a different carrier group than the second component carrier. The UCI transmission component 198 may be configured to transmit the UCI in the PUSCH in the second component carrier in response to the PUCCH overlapping in time with the PUSCH and the first component carrier being associated with a same carrier group as the second component carrier.

Still referring to FIG. 1, in certain aspects, the base station 102/180 may include a UCI reception component 199 that is configured to receive UCI in a PUCCH in a first component carrier or a PUSCH in a second component carrier. The UCI reception component 199 may be configured to receive the UCI in the PUCCH in the first component carrier in response to the PUCCH overlapping in time with the PUSCH and the first component carrier being associated with a different carrier group than the second component carrier. The UCI reception component 199 may be configured to receive the UCI in the PUSCH in the second component carrier in response to the PUCCH overlapping in time with the PUSCH and the first component carrier being associated with a same carrier group as the second component carrier.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies id 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
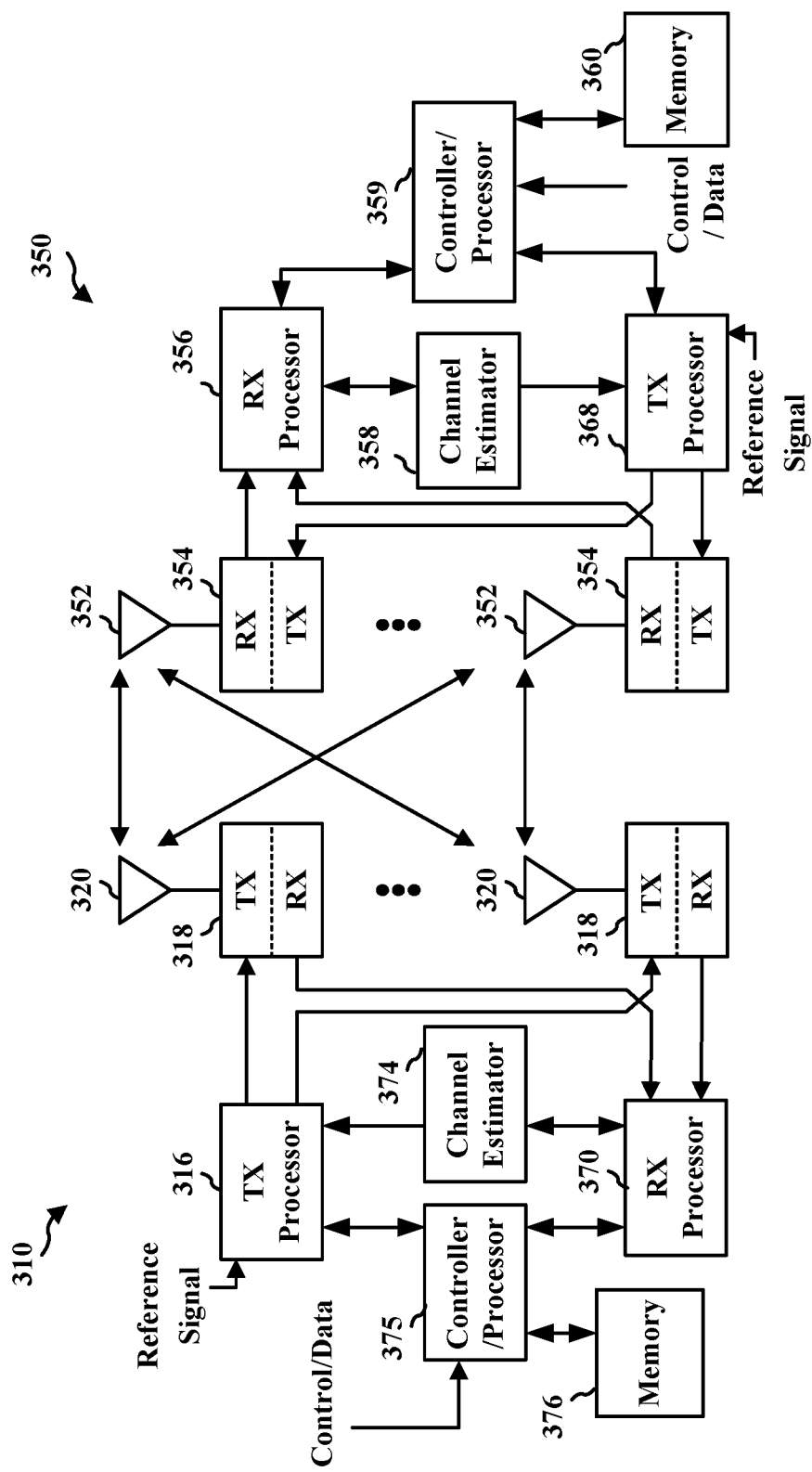
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with UCI transmission component 198 of FIG. 1.

At least one of the TX processor 316, the RX processor 370, and the controller/processor 375 may be configured to perform aspects in connection with UCI reception component 199 of FIG. 1.

In carrier aggregation (CA), two or more component carriers (CCs) may be aggregated in order to support wider transmission bandwidths. Aggregation may be arranged using contiguous CCs within the same operating frequency band (e.g. intra-band contiguous CA), using non-contiguous CCs within the same operating frequency band but with gaps in between (e.g. intra-band non-contiguous CA), and using CCs within different operating frequency bands (e.g. inter-band CA). In DL carrier aggregation, a base station transmits downlink data in multiple CCs to a UE, while in UL carrier aggregation, a UE transmits uplink data in multiple CCs to the base station.

UE transmission (Tx) power is a much desired resource in UL carrier aggregation. In order to achieve higher data rates by increasing bandwidth (i.e., aggregating more UL CCs) in large portion of a cell coverage area, UE Tx power is increased as well so that the channel or signal has sufficient power spectrum density (PSD). However, UL Tx power may be limited across UL CCs. For example, UL transmission power may be constrained within a total UL Tx power limit for carrier aggregation (e.g., a configured maximum output power, such as $P_{CMAX}$ or another name). This power limit is generally applied to prevent an unacceptably high level of radiation exposure from UL transmissions through, for example, compliance with specific absorption rate (SAR) limits. Moreover, this power limit is based on UE hardware limits (e.g., shared power amplifiers (PA) among UL CCs). For example, if a total UL Tx power limit or power class associated with these CCs is a certain value such as 23 dBm, 26 dBm, 29 dBm, or 31 dBm, the total UL Tx power across UL CCs may be limited by this value. However, for a UE that supports UL transmissions in multiple frequency bands such as in inter-band CA, UL transmissions may use different PAs in different frequency bands, and thus UL CCs across frequency bands may have different associated power limits or power classes.

Figure 4:
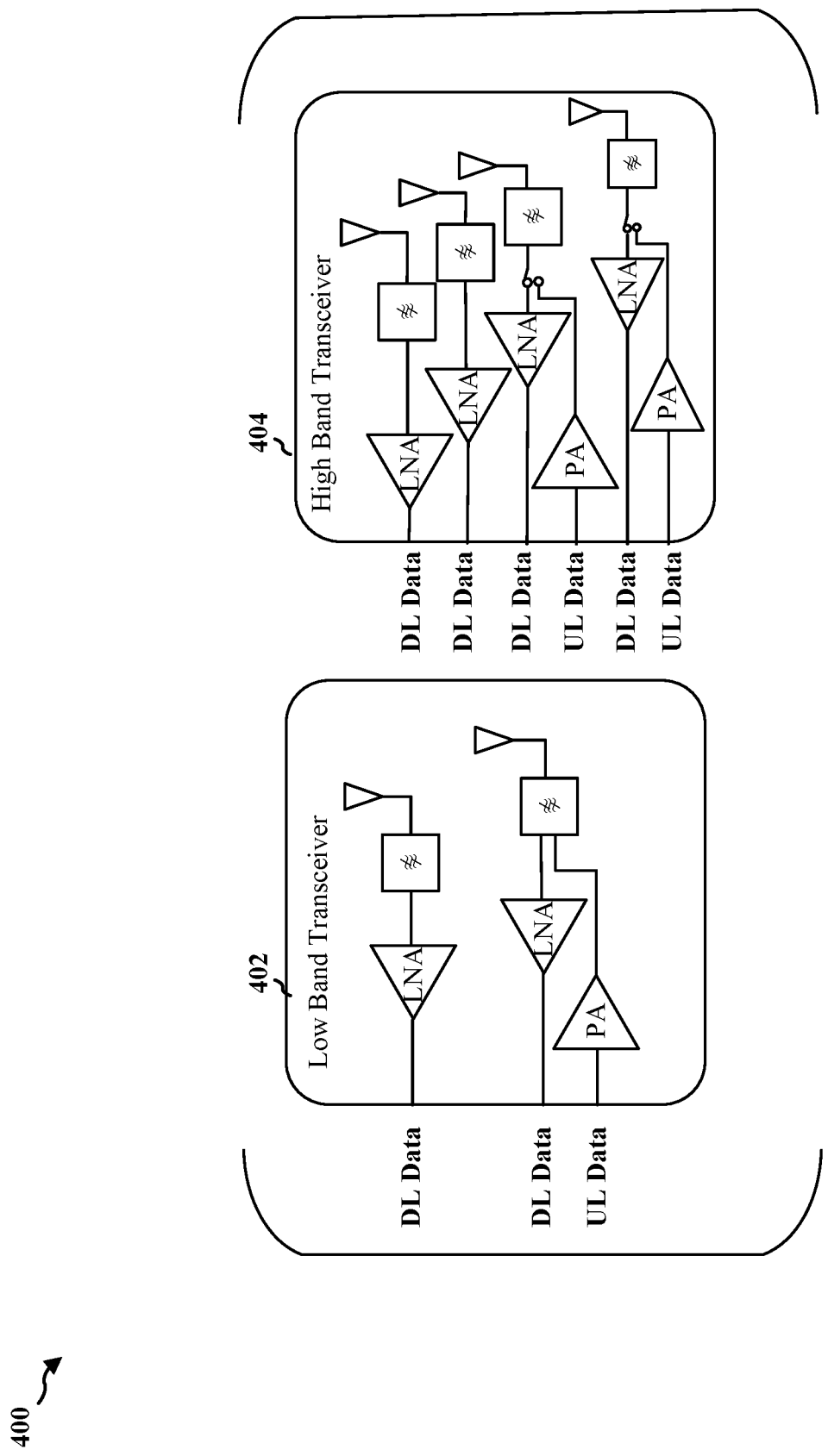
FIG. 4 is a diagram illustrating an example of a UE including low-noise amplifiers for downlink transmissions and power amplifiers associated with different frequency bands for uplink transmissions.

FIG. 4 illustrates an example 400 of a low band transceiver 402 and a high band transceiver 404 which a UE may apply in inter-band CA. For example, low band transceiver 402 and high band transceiver 404 may be part of 354RX/TX in FIG. 3. In inter-band CA, the low band transceiver 402 may transmit uplink data in one or more CCs in a first frequency band, while the high band transceiver may transmit uplink data in one or more CCs in a second frequency band at a higher bandwidth than the first frequency band. The low band transceiver 402 and high band transceiver 404 may include different low-noise amplifiers (LNAs) and PAs. For instance, in the illustrated example, two antennas and one PA are included in the low band transceiver, while four antennas and two PAs are included in the high band transceiver, although the number of antennas and PAs in each transceiver may be different in other examples. Here, the low band may be associated with a power class of 23 dBm, while the high band may be associated with a power class of 23 or 26 dBm, although the power classes may be different in other examples. For example, the high band transceiver may include a single PA with a 26 dBm power class or a dual PA with a 23 dBm power class to result in a 26 dBm power class for the high band. In the example illustrated in FIG. 4, in intra-band CA, the PAs associated with a given frequency band may limit the power of UL transmissions across CCs in the given frequency band, while in inter-band CA, this power limit may no longer apply, since the UL transmissions are across CCs in different frequency bands associated with different PAs.

As a result, for certain inter-band CA (e.g., inter-band CA where the UE has different PAs for multiple frequency bands), a UE with a certain power class for each frequency band may be able to transmit data with higher total UE Tx power than the power class for any of the frequency bands. However, in order to comply with SAR requirements/conditions, such UE may not be able to transmit data with higher total UE Tx power continuously. In general, SAR requirements/conditions are described such that a radio exposure of a frequency range (e.g., Sub-6 GHz or above-6 GHz) over a time window of seconds or minutes should not exceed a particular limit. To achieve a short-term higher total UE Tx power while meeting the long-term SAR requirements/conditions, a UE may dynamically apply uplink power aggregation for its CCs across frequency bands. For instance, the UE may aggregate a configured maximum output power for uplink transmissions in each frequency band to achieve a total available short term, peak transmission power for its UL CCs. This aggregation may allow for the UE to transmit data using a higher Tx power than that which would otherwise be available in individual frequency bands, thereby providing a boost to UL peak data rate and correspondingly increased UL user-perceived throughput. For instance, in the example of FIG. 4, the available UL Tx power provided by the low band transceiver 402 and high band transceiver 404 may be aggregated to result in an increase in total transmission power significantly above that which each transceiver can individually support, for example, 28 or 29 dBm in total.

Figure 5:
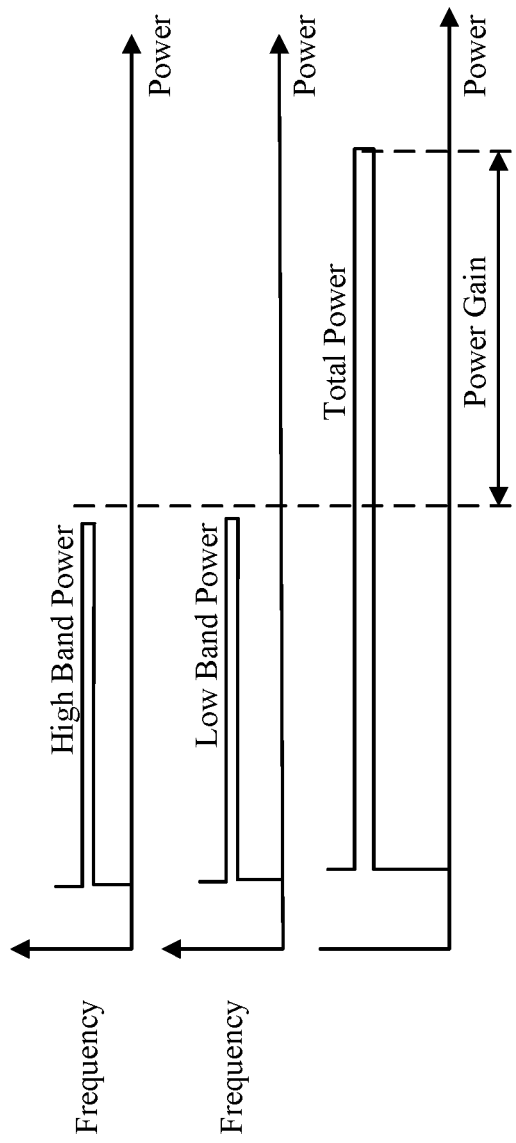
FIG. 5 is a diagram illustrating an example of an uplink transmission power gain resulting from aggregation of uplink transmission power in different frequency bands.

FIG. 5 illustrates an example 500 of an UL Tx power gain that may result from aggregation of the available Tx power in different frequency bands. For instance, the UE may combine the available low band power in low band transceiver 402 with the available high band power in high band transceiver 404 of FIG. 4 to result in a total transmission power with associated power gain. The UE may achieve this power gain in inter-band CA, for example, due to the association of different PAs with the low and high frequency bands as indicated in FIG. 4. As a result, the UE may apply a higher peak data rate and throughput in inter-band CA than in intra-band CA, since the Tx power available to the UE in multiple frequency bands may be less constrained by the configured maximum output power limit.

As previously described, this aggregation of UL Tx power for inter-band CA may not be long term due to SAR constraints. Generally under SAR constraints, a UE may be subject to the aforementioned UL Tx power limit for longer duty cycles (e.g., lasting for 30 seconds or more) to avoid significant radiation exposure from significantly high Tx power. However, this limit may be more relaxed for shorter duty cycles. As a result, to achieve the benefits of dynamic UL power aggregation in inter-band CA without being constrained by the power limit across frequency bands, the UE may shorten its duty cycle (or reduce the amount of time the UL power aggregation occurs) to avoid exceeding SAR limits. This approach allows the UE to still apply UL power aggregation in inter-band CA for greater coverage enhancement without risk of harmful radiation exposure.

Figure 6A:
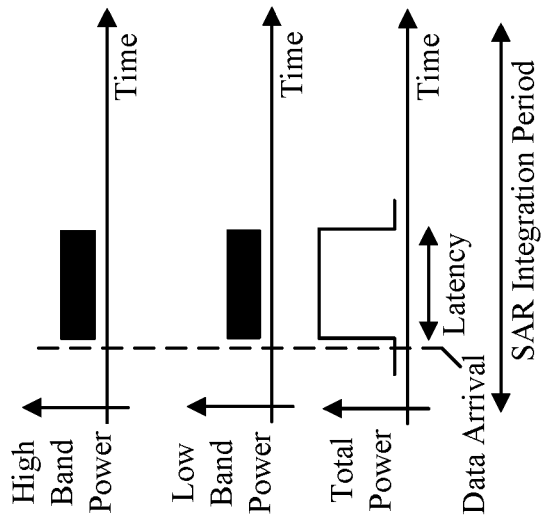
FIGS. 6A-6B are diagrams illustrating examples of total uplink transmission power that a UE may apply in inter-band carrier aggregation in longer and shorter duty cycles respectively within a specific absorption rate integration period.
Figure 6B:
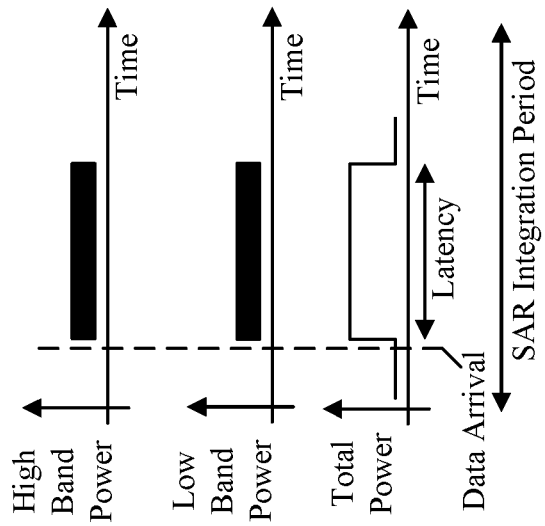

FIGS. 6A-6B illustrate examples 600, 650 of a difference in total UL Tx power that a UE may achieve in inter-band CA respectively for longer and shorter duty cycles or latencies within a SAR integration period. For instance, in the example 600 of FIG. 6A where the duty cycle of an UL transmission lasts for a relatively long period of time, the total UL Tx power may be constrained by the maximum configured output power for a particular power class (e.g., 23 dBm) to meet SAR limits. In contrast, in the example 650 of FIG. 6B where the duty cycle of an UL transmission lasts for a relatively shorter period of time, the total UL Tx power may be aggregated above the power class (e.g., to 28 or 29 dBm) while still meeting SAR constraints. Thus, the benefit of uplink power aggregation across frequency bands in inter-band CA may be realized with shorter duty cycles such as illustrated in FIG. 6B.

However, even though uplink power aggregation may be realized in inter-band CA for shorter duty cycles notwithstanding the aforementioned power limit, conventional UCI multiplexing rules still take this power limit into account. For instance, while the UE generally transmits UCI in PUCCH on a primary cell, if a circumstance occurs where the UCI in PUCCH overlaps in time with data in one or more PUSCHs in a same or different CC(s), the UE saves Tx power by dropping the PUCCH transmission including UCI and instead multiplexing the UCI with uplink data in one of the PUSCHs instead. As a result, by dropping the PUCCH transmission including UCI in such circumstance, the UE may divert the Tx power that otherwise would have been utilized for PUCCH instead for the PUSCH transmission, thus remaining within the power limit.

Figure 7:
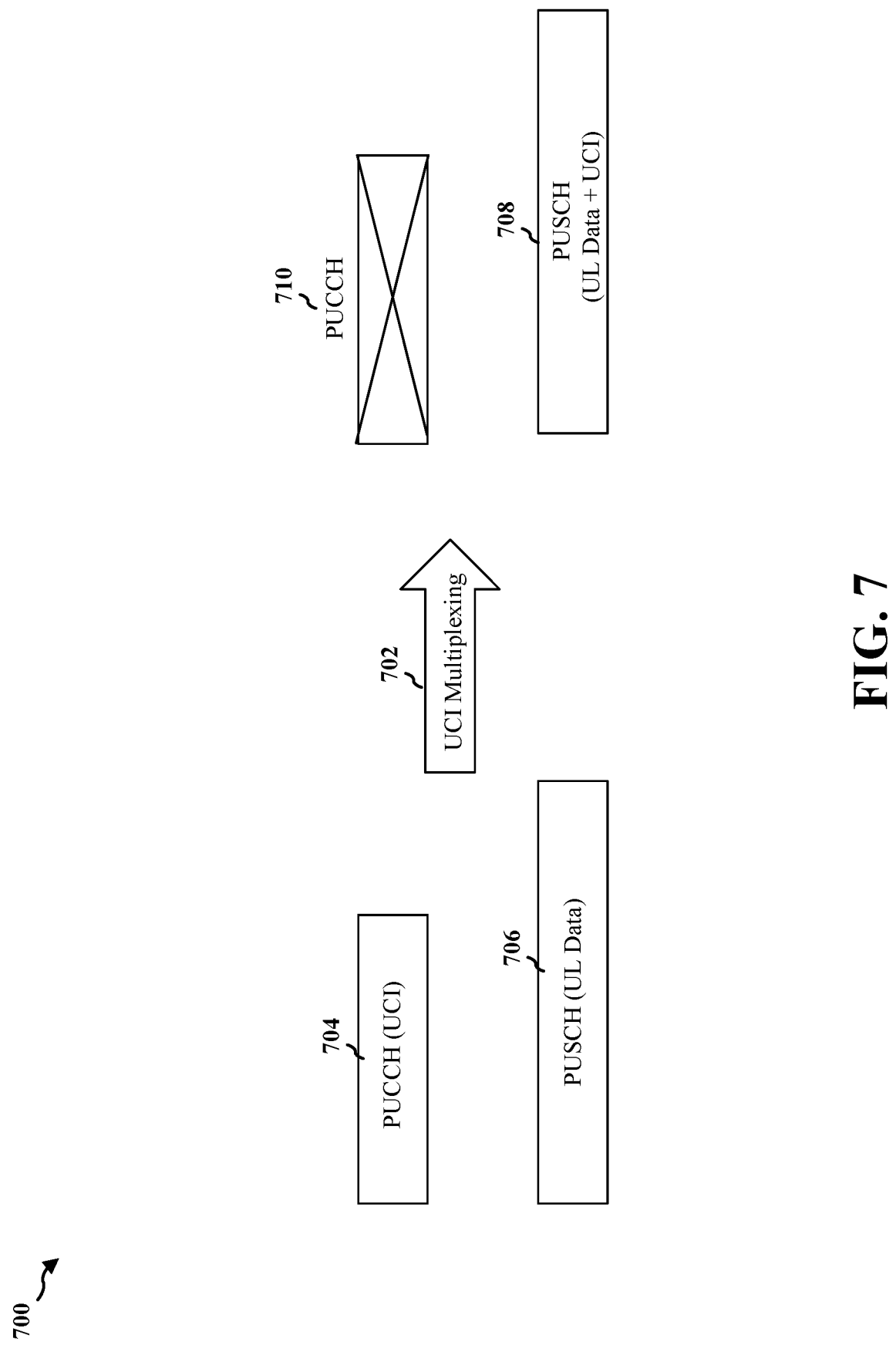
FIG. 7 is a diagram illustrating an example of uplink control information (UCI) multiplexing when UCI in a physical uplink control channel (PUCCH) overlaps in time with uplink data in a physical uplink shared channel (PUSCH).

FIG. 7 illustrates an example 700 of UCI multiplexing 702 when UCI in a PUCCH 704 in one CC overlaps in time with uplink data in a PUSCH 706 in another CC or in the same CC. When at least one symbol of the UCI overlaps in time with at least one symbol of the UL data, the UE multiplexes the UCI in PUCCH 704 with the UL data in PUSCH 706 (as illustrated by multiplexed PUSCH transmission 708). Moreover, the UE drops the transmission of the PUCCH 704 (as illustrated by dropped PUCCH transmission 710). As a result, UL Tx power that would otherwise be split between the PUCCH 704 and PUSCH 706 would be diverted to the PUSCH 706, allowing for the multiplexed UCI to be transmitted with the configured maximum output power for that CC.

However, while the power benefit of this conventional UCI multiplexing rule is apparent for intra-band CA where the CC(s) including the PUCCH and PUSCH are typically in a same carrier group associated with a same PA, this rule is not efficient for inter-band CA where the CCs including the PUCCH and PUSCH may be in different carrier groups associated with different PAs. For instance, in intra-band CA, transmission of PUCCH and PUSCH data using the same PAs would generally result in a split in transmission power allocated for each channel in that frequency band, and therefore dropping the PUCCH transmission in favor of the PUSCH transmission due to PUCCH and PUSCH overlap would allow multiplexed UCI to be transmitted at the configured maximum output power for the CC of the PUSCH. However, in inter-band CA where transmission of PUCCH and PUSCH may occur using different PAs (e.g., in the low band transceiver 402 and high band transceiver 404 of FIG. 4 respectively), there may be less of a power benefit achieved by dropping the PUCCH transmission since the UE may still be able to transmit both PUCCH and PUSCH data at the maximum configured output power in their respective frequency bands. Indeed, if UCI multiplexing was still employed in such situation, the UCI transmission would end up sharing resources (and thus energy) with the uplink data transmission, leading to unnecessarily less Tx power associated with the UCI. In contrast, if the UE were to simultaneously transmit the UCI in PUCCH and uplink data in PUSCH in such situation during inter-band CA, there would be more of a power benefit here since the UE may be able to apply its maximum available Tx power to each transmission to improve data reliability and enhance coverage.

Accordingly, the UE may apply different UCI multiplexing rules in inter-band UL CA compared to intra-band CA in order to account for situations in which the CCs of PUCCH and PUSCH are in different carrier groups (or associated with different PAs). In contrast, for situations where the PUCCH and PUSCH CCs are in a same carrier group (or associated with the same PAs), the UE may apply similar UCI multiplexing rules to those irrespective of carrier groups or PAs. For example, if the UCI in PUCCH overlaps with uplink data in one or more PUSCH in a same carrier group as the PUCCH (or associated with the same PA as the PUCCH, notwithstanding whether the PUCCH and PUSCH(s) are in same or different carriers or frequency bands), the UE may multiplex the UCI in PUSCH and drop the PUCCH transmission in order to maximize Tx power of the PUSCH as previously described. In such case, the PUSCH in which the UCI is multiplexed may be the PUSCH having a particular serving cell index (e.g., the lowest serving cell index) among cells having simultaneous PUSCH transmissions, or a PUSCH selected according to a different UCI multiplexing rule.

Figure 8A:
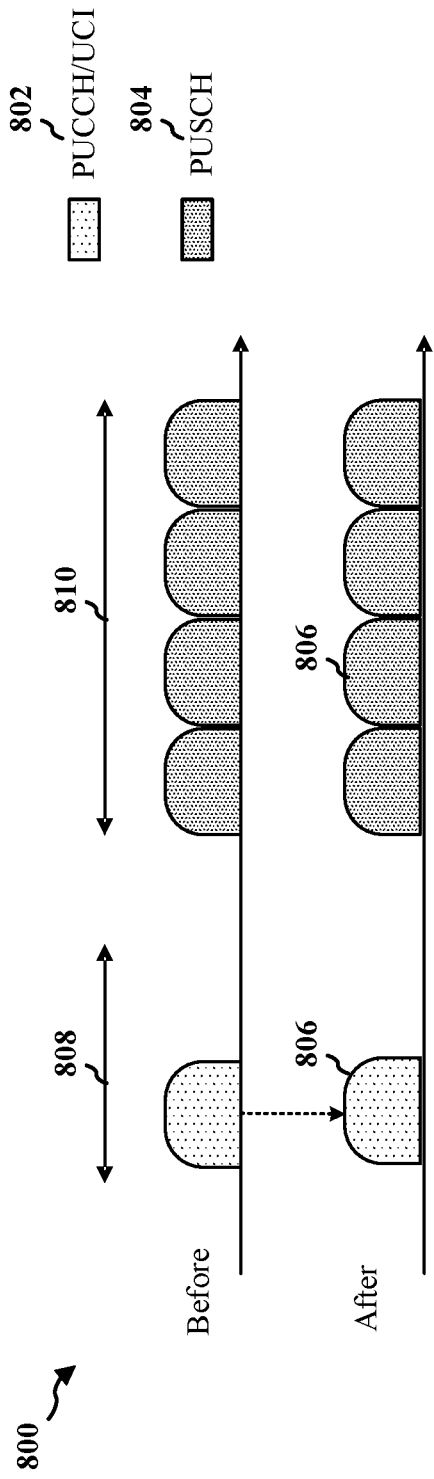
FIGS. 8A-8B are diagrams illustrating examples respectively of different UCI multiplexing rules applied in inter-band carrier aggregation depending on whether or not a PUCCH and an overlapping PUSCH are within a same carrier group sharing a power amplifier for uplink transmissions.
Figure 8B:
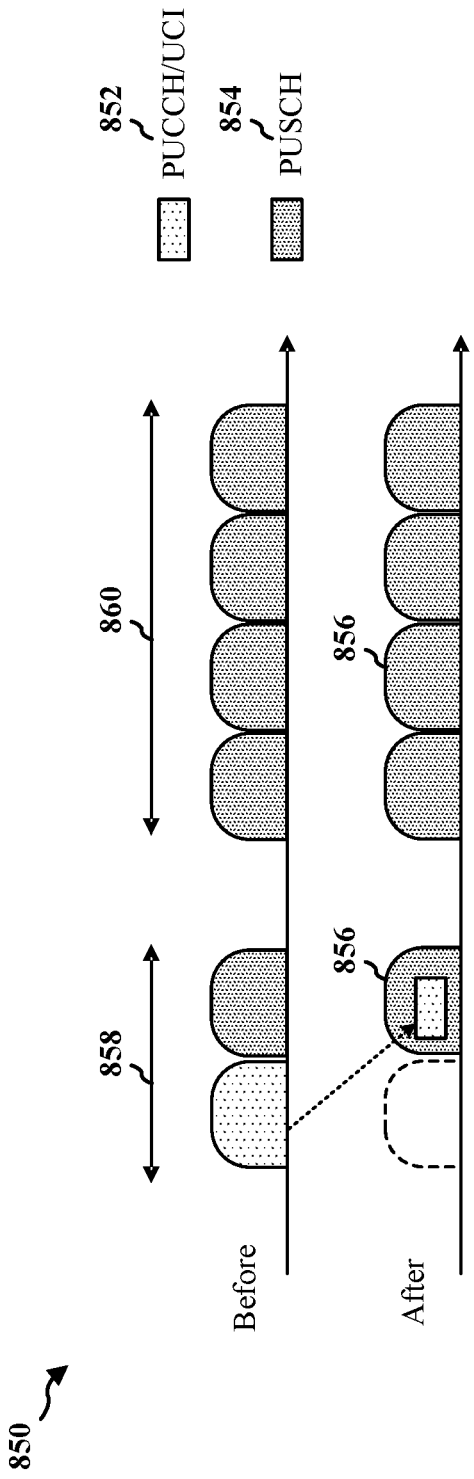

FIGS. 8A-8B illustrate examples 800, 850 respectively of UCI multiplexing rules applied in inter-band CA depending on whether or not a PUCCH and an overlapping PUSCH are within a same or different carrier group sharing a PA for uplink transmissions. Referring to FIG. 8A in one example, if a PUCCH 802 overlaps with one or more PUSCHs 804 in carriers 806 of different carrier groups 808, 810 associated with different PAs, the aforementioned power limiting is no longer beneficial and therefore the UCI may be transmitted in PUCCH 802 to maximize the Tx power of the UCI. Here, the UCI is not multiplexed in any of the PUSCHs 804 in this example since none of the PUSCHs are in a same carrier group associated with a same PA as the PUCCH 802. In contrast, referring to FIG. 8B in another example, if a PUCCH 852 overlaps with one or more PUSCHs 854 in a same carrier or in different carriers 856 of a same carrier group 858 associated with a same PA, and if the PUCCH 852 additionally overlaps with one or more PUSCHs 854 in carriers 856 of a different carrier group 860 associated with a different PA than that of the PUCCH 852, the UCI is multiplexed on one of the PUSCHs 854 in the carrier group 858 associated with the same PA and the PUCCH 852 is not transmitted. The UCI multiplexing may be according to similar rules as those previously described (e.g., the PUSCH associated with the lowest serving cell index). For example, the UCI may be multiplexed in the PUSCH 854 transmitted on the lowest serving cell index among cells having simultaneous PUSCH transmissions in frequency bands using the same PA as the PUCCH 852. However, the PUSCHs 854 considered for UCI multiplexing are those which are associated with the same PA. For instance, in the example of FIG. 8B, the PUSCH(s) 854 in the same carrier group 858 as the PUCCH 852 may have their serving cell indices considered for UCI multiplexing; in contrast, the other PUSCH(s) in the different carrier group 860 associated with different PAs will be excluded from the consideration.

Thus, as described with respect to FIGS. 8A and 8B, UCI multiplexing may or may not occur depending on whether a PUSCH shares a PA or is associated with a different PA than the PUCCH. The base station may identify whether and which carriers share PAs in multiple ways. In one example, the base station may identify whether carrier(s) including PUCCH and PUSCH share the same PA or are associated with different PAs based on the frequency bands of the PUCCH and PUSCH. Generally, CCs in different frequency bands may be associated with different PAs (and thus carriers in a same frequency band may share a PA). As a result, the base station may generally determine the PA association of different CCs from CA band combinations indicated in a capability information message of the UE, without the need for additional capability signaling. For instance, in the example of FIGS. 8A and 8B, the carriers in carrier group 808, 858 may in one frequency band, while the carriers in carrier group 810, 860 may be in another frequency band. However, this generalization may have exceptions. For example, frequency bands that do not have sufficient frequency separation from each other may possibly share the same PA. For instance, in the example of FIGS. 8A and 8B, at least one of the carriers in carrier group 810, 860 may belong to a different frequency band than the other carriers in carrier group 810, 860. As a result, UE capability signaling may be beneficial to inform the base station of PA associations.

Therefore, in another example, the UE may additionally indicate via capability signaling which frequency bands or which UL CCs are associated with the same PA or different PAs. In one example, the UE may provide a capability information message to the base station which reports, for an indicated CA band combination, one or more groups of frequency bands which use the same PA, thereby identifying which frequency bands use the same PA and thus which bands use a different PA. As an example, if the UE indicates in the message support for CA band combination n1A-n3A-n5A-n7A-n78A, the UE may further indicate that band n1A is associated with one PA (e.g., n1A is in one band group) and that bands n3A, n5A, n7A, and n78A are associated with another PA (e.g., bands n3A, n5A, n7A, and n78A are in another band group). Similarly, in the examples of FIGS. 8A and 8B, the UE may indicate that the frequency band(s)

including the carriers in carrier group 808, 858 are within one band group and the frequency band(s) including the carriers in carrier group 810, 860 are in a different band group.

Additionally, the UE may further report, for an indicated CA band combination, a total maximum Tx power for each of the one or more indicated groups of frequency bands. For example, in the aforementioned CA band combination example, the UE may additionally indicate that the group including band n1A is associated with a configured maximum output power of 23 dBm, while the group including bands n3A, n5A, n7A, and n78A are associated with another configured maximum output power of 26 dBm. Similarly, in the examples of FIGS. 8A and 8B, the UE may indicate that the frequency band(s) including carrier group 808, 858 are associated with a maximum UL Tx power of 23 dBm while the frequency band(s) including carrier group 810, 860 are associated with a maximum UL Tx power of 26 dBm.

In response to this capability signaling, the base station may determine whether and how the UE may apply UCI multiplexing, for instance, the different multiplexing rules previously described with respect to FIGS. 8A and 8B. For instance, the base station may configure the UE to maintain a PUCCH transmission (without UCI multiplexing) in response to determining the PUCCH carrier is in a different frequency band or associated with a different maximum UL Tx power than any overlapping PUSCH (and thus that the PUCCH and PUSCH are in different carriers of different carrier groups associated with different PAs, such as illustrated in FIG. 8A). Similarly, the base station may configure the UE to multiplex UCI in a PUSCH carrier in response to determining the PUSCH carrier is in a same frequency band or associated with a same maximum UL Tx power as the PUCCH including UCI (and thus that the PUCCH and PUSCH are in a same or different carrier of a same carrier group associated with a same PA, such as illustrated in FIG. 8B).

Thus, based on the identification of PA usage for different carriers in uplink CA, the base station may configure the UE to apply any of the aforementioned UCI feedback procedures for inter-band UL-CA. For instance, depending on the frequencies of the carriers in indicated frequency bands in a supported CA band combination, the base station may indicate the UE to report UCI feedback in inter-band UL CA as described with respect to FIG. 8A or 8B. For example, the base station may send the UE a RRC configuration indicating the UE to apply either the UCI multiplexing rule of FIG. 8A (e.g., refrain from performing UCI multiplexing and transmit UCI in the PUCCH), or the UCI multiplexing rule of FIG. 8B (e.g., drop the PUCCH transmission and exclude carriers in a given frequency band when multiplexing UCI), in response to identifying which frequency bands share the same PA and which frequency bands are associated with different PAs. If the base station does not explicitly configure the UE to apply any such UCI multiplexing rule associated with carrier groups or PAs such as described above with respect to FIGS. 8A and 8B (e.g., if the UE does not receive an RRC configuration indicating or activating such rule(s) from the base station), then the UE may by default apply conventional UCI multiplexing rules irrespective of carrier group or PA. For instance, if a PUCCH is overlapped with one or more PUSCHs, the UE may multiplex the UCI in a PUSCH with the lowest serving cell index regardless of whether that PUSCH shares a PA or not with the overlapping PUCCH.

As a result, the UE may adjust transmissions of overlapping UCI and uplink data according to different UCI multiplexing rules based on carrier groups or PA associations for improved performance. The UE may apply these rules while applying dynamic power aggregation in inter-band uplink CA and without being constrained by the total configured maximum output power of the UE across frequency bands, instead being able to independently apply a configured maximum output power for each carrier or frequency band. For instance, notwithstanding a total power limit $P_{CMAX}$ which may be configured across frequency bands for inter-band CA, the UE may independently apply, for each UL bandwidth part b of carrier f in a serving cell c of the UE when performing UCI multiplexing, a PUSCH transmission power $P_{PUSCH,b,f,c}$ which does not exceed a configured maximum output power $P_{CMAX,f,c}$. Examples of how $P_{PUSCH,b,f,c}$ and $P_{CMAX,f,c}$ may be calculated are shown in Equations (1) and (2) below respectively:

$$P_{PUSCH,b,f,c}(i, j, q_d, l) = \min \begin{cases} P_{CMAX,f,c}(i), \\ P_{O\_PUSCH_b,f,c}(j) + 10\log_{10}(2^\mu \cdot M_{RB,b,f,c}^{PUSCH}(i)) + \alpha_{b,f,c}(j) \cdot \\ PL_{b,f,c}(q_d) + \Delta_{TF,b,f,c}(i) + f_{b,f,c}(i, l) \end{cases} \quad (1)$$

where $P_{PUSCH,b,f,c}(i, j, q_d, l)$ is a PUSCH transmission power for a PUSCH on active UL BWP b of carrier f of serving cell c using parameter set configuration with index j and PUSCH power control adjustment state with index l in PUSCH transmission occasion i, $P_{CMAX,f,c}(i)$ is the UE configured maximum output power defined for carrier f of serving cell c in PUSCH transmission occasion i, $M_{RB,b,f,c}^{PUSCH}(i)$ is the bandwidth of the PUSCH resource assignment expressed in number of resource blocks, $PL_{b,f,c}(q_d)$ is a downlink pathloss estimate in dB calculated by the UE using reference signal (RS) index $q_d$, $f_{b,f,c}(i, l)$ is a PUSCH power control adjustment state, and $P_{O\_PUSCH_b,f,c}(j)$, $\alpha_{b,f,c}(j)$ and $\Delta_{TF,b,f,c}(i)$ are other configured parameters; and $$P_{CMAX_L,f,c} \leq P_{CMAX,f,c} \leq P_{CMAX_H,f,c} \quad (2)$$

$$P_{CMAX_L,f,c} = \text{MIN}\{P_{EMAX_L,f,c} - \Delta T_{C,c}(P_{PowerClass} - \Delta P_{PowerClass}) - $$

$$\text{MAX}(\text{MAX}(MPR_c + \Delta MPR_c, AMPR_c) + \Delta T_{IB,c} + $$

$$\Delta T_{C,c} + \Delta T_{RxSRS}, PMPR_c)\}$$

$$P_{CMAX_H,f,c} = \text{MIN}\{P_{EMAX,c}, P_{PowerClass} - \Delta P_{PowerClass}\}$$

where $P_{CMAX,f,c}$ is the configured maximum output power for carrier f of serving cell c in each slot, $P_{PowerClass}$ is the maximum UE power, $\Delta T_{IB,c}$ is the additional tolerance for serving cell c, P-MPR$_c$ is the power management maximum power reduction for ensuring compliance with applicable electromagnetic energy absorption requirements, and $P_{EMAX,c}$, $\Delta P_{PowerClass}$, $MPR_c$, $A\text{-}MPR_c$, $\Delta T_{RxSRS}$ are other configured parameters.

However, if the UE applies uplink power aggregation using the configured maximum output power for each carrier over a long period of time (e.g., in a 30 second duty cycle) there is a possibility that radiation exposure may occur beyond acceptable SAR or maximum permissible exposure (MPE) limits. For instance, unacceptable radiation exposure may occur in response to, for example, network scheduling of uplink transmissions using dynamic power aggregation for such lengthy periods of time. Accordingly, to mitigate this possibility, the configured maximum output power may include a power reduction or power backoff. For example, to prevent radiation exposure from exceeding acceptable SAR/MPE levels, Equation (2) above defines in one example that the power limit $P_{CMAX,f,c}$ is a function of a power management maximum power reduction (a Tx power reduction) P-MPRc, which represents a backoff applied to a given cell c which considers MPE/SAR. That is, the maximum UE Tx power $P_{CMAX,f,c}$ may be a function of an allowed power backoff P-MPR for a given cell c, P-MPRc. Accordingly, if the UE intends to apply maximum Tx power for a long duty cycle (e.g., 30 seconds or more), the UE may reduce the total Tx power applied to address MPE/SAR using the power backoff.

Figure 9:
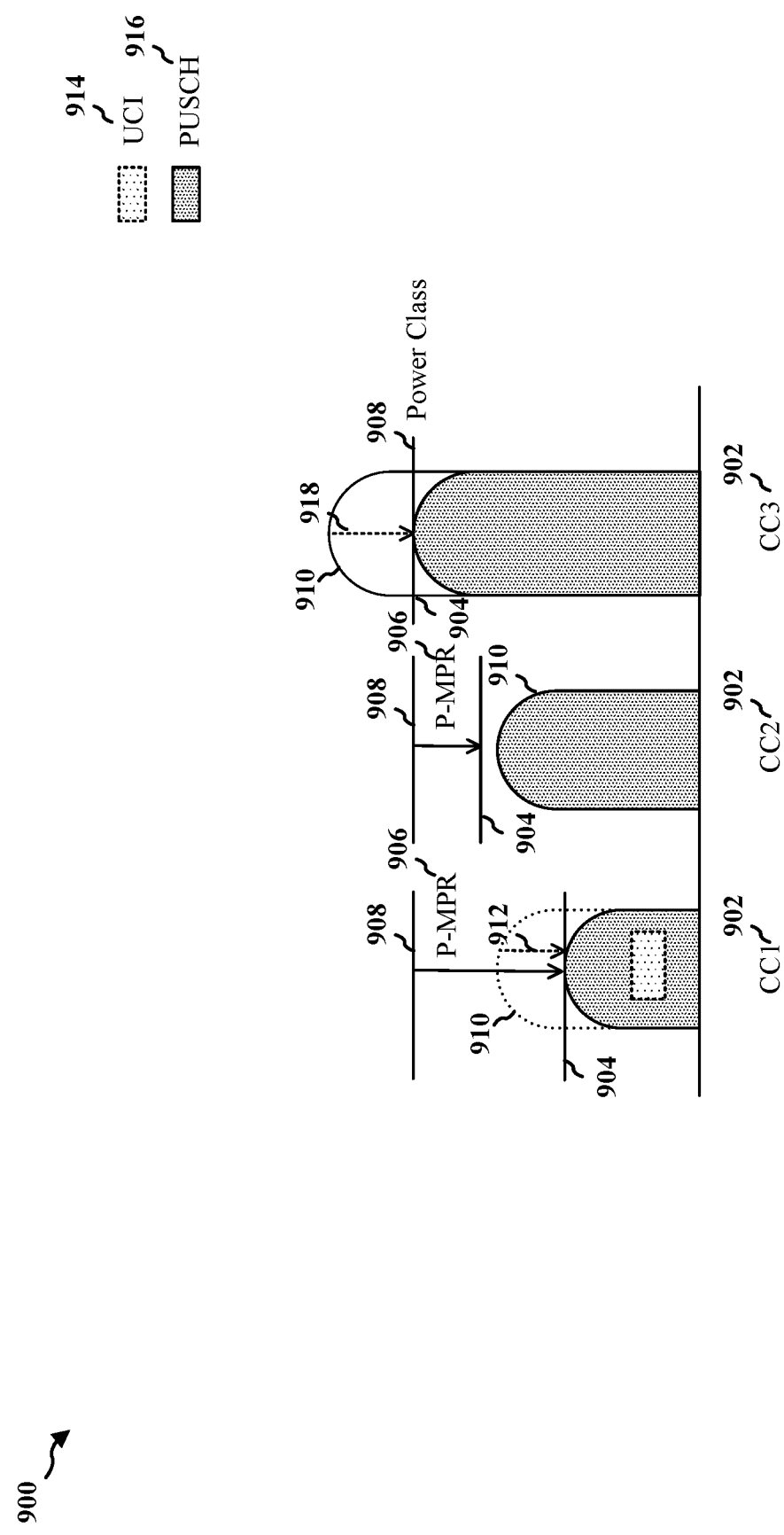
FIG. 9 is a diagram illustrating an example of uplink component carriers in inter-band carrier aggregation having different configured maximum output powers in response to different power backoffs.

FIG. 9 illustrates an example 900 of carriers 902 (uplink CCs) in inter-band CA having different configured maximum output powers 904 $P_{CMAX,f,c}$ in response to different power backoffs 906 P-MPRc. Each of the CCs may be associated with a power class 908, representing the maximum UE power for that CC. Power classes may be based on the PAs utilized for that CC, and thus each carrier group sharing PAs may include the same power class. Each of the CCs may also be associated with a respective power backoff representing the power management maximum power reduction for that CC. A PUSCH transmission power 910 $P_{PUSCH,b,f,c}$ for each CC may be scaled down to the configured maximum output power 904 for that CC, which includes the power backoff 906 of that CC, so that the available Tx power may meet SAR or MPE constraints. An example of this power scaling is shown by power reduction 912 for CC1 in FIG. 9, which CC in this example carries UCI 914 in response to a carrier group-based UCI multiplexing rule for PUSCH 916 such as described with respect to FIG. 8B. Alternatively, if the PUSCH transmission power 910 is already less than the configured maximum output power for a CC, no power scaling may occur, such as shown for CC2 in the example of FIG. 9. If no power backoff happens to be applied for a particular CC (e.g., P-MPRc=0), then the power scaling may be solely based on the power class for that CC, such as illustrated by power reduction 918 for CC3 in the example of FIG. 9.

Currently, there is no specific rule indicating to the UE the carriers on which a power backoff P-MPRc will be applied to reduce total UL Tx power, nor is there a specific rule indicating the amount of such power reduction. Therefore, for UL CA, typically the UE arbitrarily decides the carrier(s) and amount of P-MPR to be applied to an uplink transmission in order to reduce the total Tx power sufficiently within SAR/MPE limits. Thus, in the example of FIG. 9, in UL CA, the UE may apply P-MPR to any of the carriers 902 to meet the limit $P_{CMAX,f,c}$ However, when the UE also performs UCI multiplexing such as described with respect to FIGS. 8A and 8B, then the impact of the power backoff may change depending on the carrier to which the power reduction is applied. For instance, while applying P-MPR to PUSCH carrier(s) containing UCI may still result in an acceptable amount of UL Tx power for successfully transmitting multiplexed UCI, applying P-MPR to a PUCCH carrier containing UCI may undesirably degrade the UCI and impact performance. For instance, in an alternative example to that shown in FIG. 9, if the UCI 914 is determined to be transmitted on a PUCCH in CC1 in one frequency band according to the UCI multiplexing rule described with respect to FIG. 8A, the power degradation from P-MPR relative to the other CCs may be too significant and possibly interfere with decoding of the UCI at the base station.

To address this possible application of P-MPR to a PUCCH carrier, the UE may apply a diversity scheme for UCI transmissions. For instance, in the example of FIG. 9, the UE may not only transmit the UCI in CC1 as illustrated, but also multiplex the UCI in a different carrier (e.g., CC2, CC3) in response to there being less power reduction in those carriers, thus achieving diversity. Thus, the UE may combine the UCI multiplexing rules described with respect to FIGS. 8A and 8B with additional rules providing diversity in UCI transmissions. For instance, if the UE aggregates a PUCCH carrier in one frequency band with a PUSCH carrier in another frequency band such as illustrated in FIG. 8A, then not only may the UE transmit the UCI in PUCCH in one frequency band as previously described, but the UE may also multiplex the UCI with uplink data in PUSCH in the other frequency band if this PUSCH carrier is in a different carrier group associated with a different PA than the PUCCH carrier. Similarly, if the UE aggregates a PUCCH carrier with a PUSCH carrier in a same frequency band such as illustrated in FIG. 8B, then not only may the UE multiplex the UCI in the PUSCH carrier as previously described, but the UE may also multiplex the UCI with another PUSCH carrier in another frequency band if this other PUSCH carrier is similarly in a different carrier group associated with a different PA than the PUCCH carrier. This additional UCI multiplexing in either example may be beneficial since, even if the UE reduces the Tx power of UCI in one carrier (such as a CC including PUCCH) due to SAR/MPE constraints such that the UL transmission may be significantly power scaled down or even dropped due to large P-MPR, the UCI may still survive in another carrier (such as a different CC including PUSCH). As a result, additional diversity gain may be achieved with minimized performance degradation as well as improved reliability of UCI feedback.

FIGS. 10A-10B illustrate examples 1000, 1050 respectively of UCI multiplexing rules further incorporating a diversity scheme when a PUSCH carrier is in a different carrier group associated with a different PA than a PUCCH carrier or other PUSCH carrier including UCI. Referring to FIG. 10A, in one example, the UE may check whether a PUCCH 1002 does not overlap with a PUSCH 1004 in a carrier 1006 of a same carrier group 1008 associated with a same PA, irrespective of whether the PUCCH and PUSCH are in a same carrier or in different carriers (i.e., the PUSCH carriers overlapping with the PUCCH are in a different carrier group associated with a different PA than the PUCCH). In such case, the UE not only transmits UCI in the PUCCH carrier as described with respect to FIG. 8A, but also simultaneously transmits copies of the UCI in up to X−1 PUSCH carriers having the smallest serving cell index among the PUSCH carriers in a different carrier group 1010 associated with a different PA than the carrier group 1008 including the PUCCH carrier. An example of this behavior is illustrated in FIG. 10A.

Here, X represents a quantity of the carriers 1006 that may transmit UCI. Thus, since the UE already transmits UCI in the PUCCH carrier in the example of FIG. 10A, the UE may multiplex UCI in up to X−1 remaining carriers including the PUSCHs 1004, thereby achieving diversity when MPE/SAR is a consideration. While FIG. 10A illustrates an example where X=2 here, X may be larger in other examples (resulting in UCI being multiplexed in more PUSCHs), since more diversity may result in more protection of the UCI. For example, different values of X may be indicated in an RRC configuration. Also, multiplexing UCI in multiple PUSCH carriers sharing a different PA than the PUCCH carrier may be more beneficial than multiplexing UCI in a single PUSCH carrier as in the example of FIG. 8A, since the multiple PUSCHs may not all be in the same frequency band and thus may be subject to different P-MPRs. As a result, one of the multiple PUSCHs may have less power degradation than another PUSCH, allowing for UCI transmitted in that PUSCH to have improved reliability.

Now referring to FIG. 10B, in another example, the UE may check whether a PUCCH 1052 overlaps with a PUSCH 1054 in a carrier 1056 of a carrier group 1058 associated with a same PA, irrespective of whether the PUCCH and PUSCH are in a same carrier or in different carriers. In such case, the UE not only transmits UCI in the PUSCH carrier of carrier group 1058 while dropping the PUCCH transmission as described with respect to FIG. 8B, but also simultaneously transmits copies of the UCI in up to X−1 PUSCH carriers having the smallest serving cell index among the PUSCH carriers in a different carrier group 1060 associated with a different PA than the carrier group 1058 including the PUCCH carrier. An example of this behavior is illustrated in FIG. 10B.

Thus, in the example of FIG. 10B, the UE may account for potential UCI degradation due to Tx power reduction in given frequency bands. For instance, in the example of FIG. 10B, the carriers 1056 of carrier group 1058 may be in one frequency band associated with one P-MPR, while the carriers 1056 of carrier group 1060 may be in another frequency band associated with a different P-MPR. As a result, even though the UE already multiplexes UCI in the PUSCH 1054 in this example, the UE further multiplexes UCI for carrier group 1058 in another PUSCH carrier associated with a different PA than the PUSCH 1054 since there is a possibility the PUSCH carrier in carrier group 1058 may experience more power degradation (e.g., higher P-MPR) than the other PUSCH carriers in carrier group 1060.

In the foregoing examples, the UE multiplexes UCI in PUSCH transmissions in carriers with independent P-MPRs determined by the UE. For instance, in the examples of FIGS. 10A and 10B, the UE may determine the amount of the P-MPR configured for each of the carriers 1006, 1056 without taking into account on which UL CC the UCI is transmitted, and so the UE may apply the aforementioned diversity scheme involving additional UCI multiplexing to address the potential differences in power backoff among the carriers. However, in some cases, the UE may experience a level of freedom to determine which of its carriers may include UCI, even though the UE may still determine the amount of P-MPR applied to each carrier without taking into account on which UL CC the UCI is transmitted. For instance, if the P-MPR value of a cell c happens to be sufficiently large to the point that the power backoff applied to a given carrier would cause the transmission power of UCI in that carrier to be reduced by a threshold amount or ratio resulting in significant degradation of the UCI transmission, the base station may allow or instruct the UE to drop the UCI transmission in the cell or carrier. This threshold amount (or ratio) may be a predetermined or pre-configured value, such as 50% (or 3 dB) of $P_{CMAX,f,c}$ for example. In such case where the UE drops the UCI transmission in a given PUSCH carrier, the UE may instead multiplex this UCI with uplink data in any other PUSCH carrier in a different cell. For example, the UE may determine to transmit UCI in whichever PUSCH carrier has the smallest P-MPR reduction in the different cell.

Figure 11:
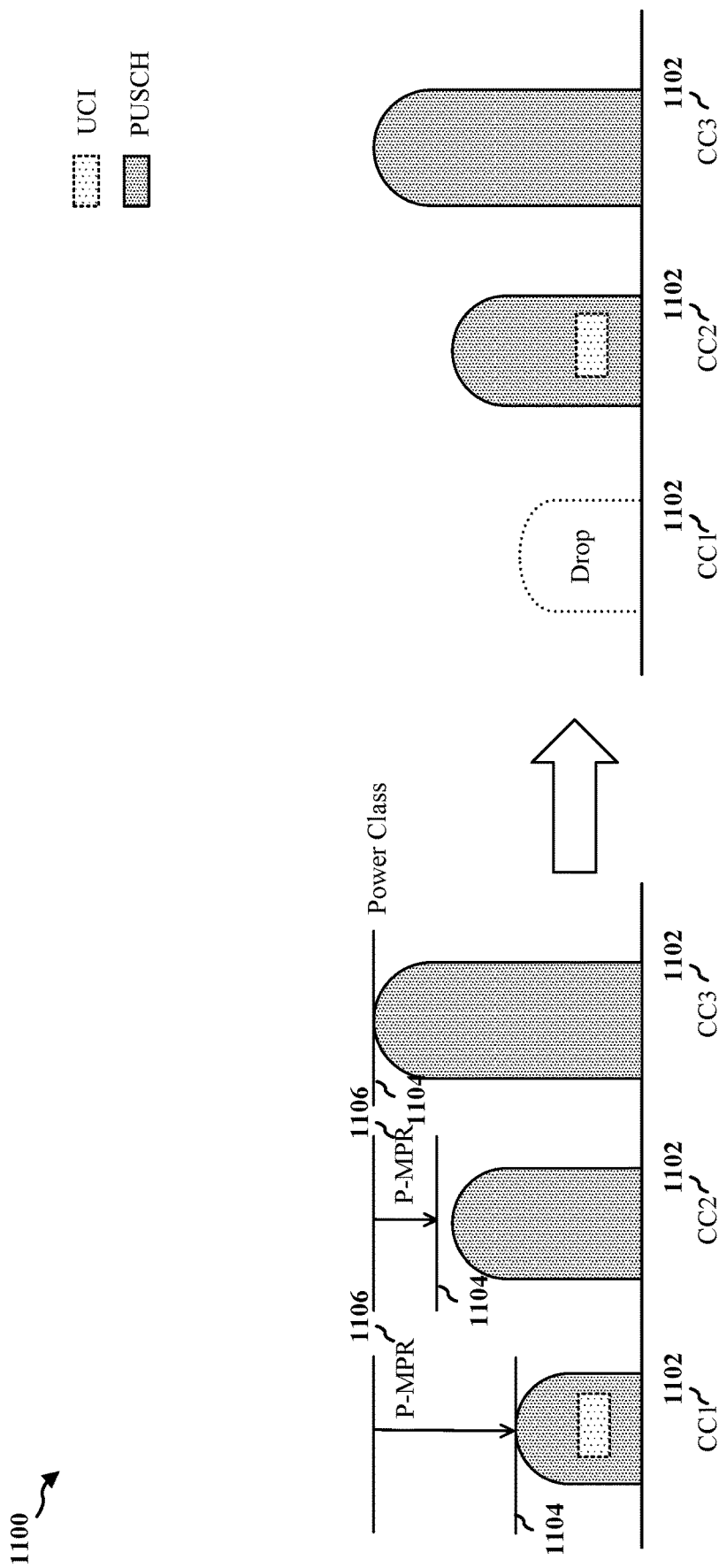
FIG. 11 is a diagram illustrating an example of uplink component carriers in inter-band carrier aggregation with different power backoffs as in FIG. 9, but where the PUSCH including UCI is dropped from one component carrier and the UCI transmitted in another component carrier based on the different power backoffs.

FIG. 11 illustrates an example 1100 of carriers 1102 (uplink CCs) in inter-band CA having different configured maximum output powers 1104 $P_{CMAX,f,c}$ in response to different power backoffs 1106 P-MPRc. This example is similar to the example of FIG. 9, but here based on the different power backoffs, a PUSCH transmission including UCI is dropped from one of the CCs (e.g., CC1), and the UCI is transmitted instead in another one of the CCs (e.g., CC2). For instance, in the illustrated example of FIG. 11, the UE may determine that an amount of the power backoff for CC1 exceeds a threshold, or that a ratio of the power backoff to the configured maximum output power of that CC falls below a threshold (e.g., a threshold of 50% (or 3 dB) for example), representing a significant drop in Tx power for CC1. As a result, in contrast to the examples of FIGS. 9, 10A, and 10B where the UE ends up transmitting UCI in CC1 notwithstanding its large P-MPR, here in the example of FIG. 11 the UE may drop the uplink transmission in CC1 and instead select to transmit the UCI in a different CC such as CC2. In this example, the UE may arbitrarily select a different CC such as CC2 to include UCI as illustrated in FIG. 11, while in other examples the UE may select a different CC with more available Tx power to transmit the UCI. For instance, the UE may alternatively select CC3 in the illustrated example since CC3 may include more available Tx power than CC2 due to having a smaller P-MPR value (e.g., P-MPR=0).

As a result of the UE determining to drop UCI from one carrier and multiplex it in a different carrier such as in the example of FIG. 11, the base station may not be able to predetermine (e.g., from a UCI multiplexing rule) which carrier actually includes the UCI, potentially resulting in decoding failures at the base station. For instance, UCI multiplexing may impact rate matching of uplink data in PUSCH, and thus without information from the UE as to which carrier includes the impacted rate matching, the base station may not be able to correctly decode the UCI in PUSCH. Therefore, to assist the base station in successfully decoding the PUSCH data, the UE may indicate to the base station using DMRS which carrier includes the multiplexed UCI (and thus impacted PUSCH rate matching). For instance, the UE may indicate the PUSCH carrier in which the UE determines to carry UCI by applying a specific DMRS group to the DMRS in that carrier, a specific DMRS sequence to the DMRS in that carrier, a specific DMRS pattern to the DMRS in that carrier, or a combination of the foregoing. For example, the base station may pre-configure or indicate in an RRC configuration a specific DMRS group, sequence, or pattern for the UE to apply to DMRS associated with a given PUSCH carrier including UCI. Otherwise, for PUSCH carriers that do not carry UCI, the UE may apply a different DMRS group, sequence, or pattern than that specified for UCI multiplexing, for instance, according to given DMRS sequence generation or mapping rules.

As an illustrative example, the UE may generate a DMRS sequence r(n), and a DMRS sequence group u for the DMRS sequence, according to at least Equations (3) and (4) respectively:

$$r(n) = r_{u,v}^{(\alpha,\delta)}(n), n = 0, 1, \ldots, M_{SC}^{PUSCH}/2^{\delta} - 1 \quad (3)$$

$$u = (f_{gh} + n_{ID}^{RS}) \bmod 30 \quad (4)$$

where r(n) is the reference signal sequence for DMRS, $r_{u,v}^{(\alpha,\delta)}(n)$ is a base sequence for the DMRS, u is the DMRS sequence group applied to the base sequence, v is a DMRS sequence number applied to the base sequence, $M_{sc}^{PUSCH}$ is a scheduled bandwidth for uplink transmission in units of subcarriers, and $\alpha$, $\delta$, $f_{gh}$, $n_{ID}^{RS}$ are configured values. Moreover, the UE may map DMRS sequence r(m) to physical resources according to at least Equation Set (5):

$$\tilde{a}_{k,l}^{(\tilde{p}0,\mu)} = w_f(k')w_t(l')r(2n+k')$$

$$k = 4n + 2k' + \Delta$$

$$k' = 0,1$$

$$l = \bar{l} + l'$$

$$n = 0,1, \ldots \quad (5)$$

where $\tilde{a}_{k,l}^{(\tilde{p}_j,\mu)}$ is an intermediate quantity to be precoded, amplitude scaled, and mapped to physical resources, r is the DMRS sequence, k represents a DMRS subcarrier position, l represents a DMRS symbol position, and n, $w_f(k')$, $w_t(l')$, $\Delta$, k', $\bar{l}$, l' are other configured values.

Based on the foregoing equations, or based on other equations in other examples, the UE may generate one DMRS group, one DMRS sequence, or one DMRS pattern to apply to DMRS in typical PUSCH carriers lacking UCI. For instance, for PUSCH carriers lacking UCI, the UE may determine one DMRS sequence according to one set of configured values in Equation (3) based on one of multiple DMRS groups according to one set of configured values in Equation (4), and the UE may map DMRS including this DMRS sequence to various time-frequency resources in one DMRS pattern according to one set of configured values in Equation (5). The base station and UE may thus have a common understanding of what DMRS group, sequence, or pattern will generally be used for typical PUSCH transmissions, and the base station may decode PUSCH data in response to received DMRS accordingly.

However, for PUSCH carriers which include UCI, the UE may apply different values to the foregoing equations, or apply different foregoing equations, to generate a different DMRS group, a different DMRS sequence, or a different DMRS pattern than those applied for other PUSCH carriers lacking UCI. For instance, for PUSCH carriers including UCI, the UE may determine a different DMRS sequence according to Equation (3) based on another one of multiple DMRS groups according to Equation (4), and the UE may map this UCI-specific DMRS including the different DMRS sequence to various time-frequency resources in another DMRS pattern according to Equation (5). The network and UE may similarly have a common understanding of which group, sequence, or pattern is to be applied for such UCI-specific DMRS. For example, the network may configure a specific DMRS group, sequence, or pattern via an RRC configuration or pre-configuration for PUSCH carriers including UCI, and the UE may generate or map the DMRS using this configuration accordingly (e.g., in Equations (3)-(5)) to indicate the occurrence of UCI multiplexing. As an example, while the UE may select one of multiple pre-configured DMRS groups according to a configured value in Equation (4) for PUSCH lacking UCI, the UE may in contrast be pre-configured or RRC-configured to apply a different one of these multiple DMRS groups for UCI-multiplexed PUSCH.

Thus, the base station may be able to determine from the DMRS whether a PUSCH carries UCI or not, without complex blind checking of UCI multiplexing in each PUSCH carrier. Instead, the base station may more efficiently check whether the DMRS of a PUSCH includes a specific group, sequence, or pattern to determine whether or not UCI is included in the PUSCH. As a result, rather than diversifying UCI for protection against P-MPR backoff as in the examples of FIGS. 10A and 10B, here the UE may choose and indicate which carrier to transmit UCI to protect from P-MPR backoff based on different DMRS configurations.

Figure 12:
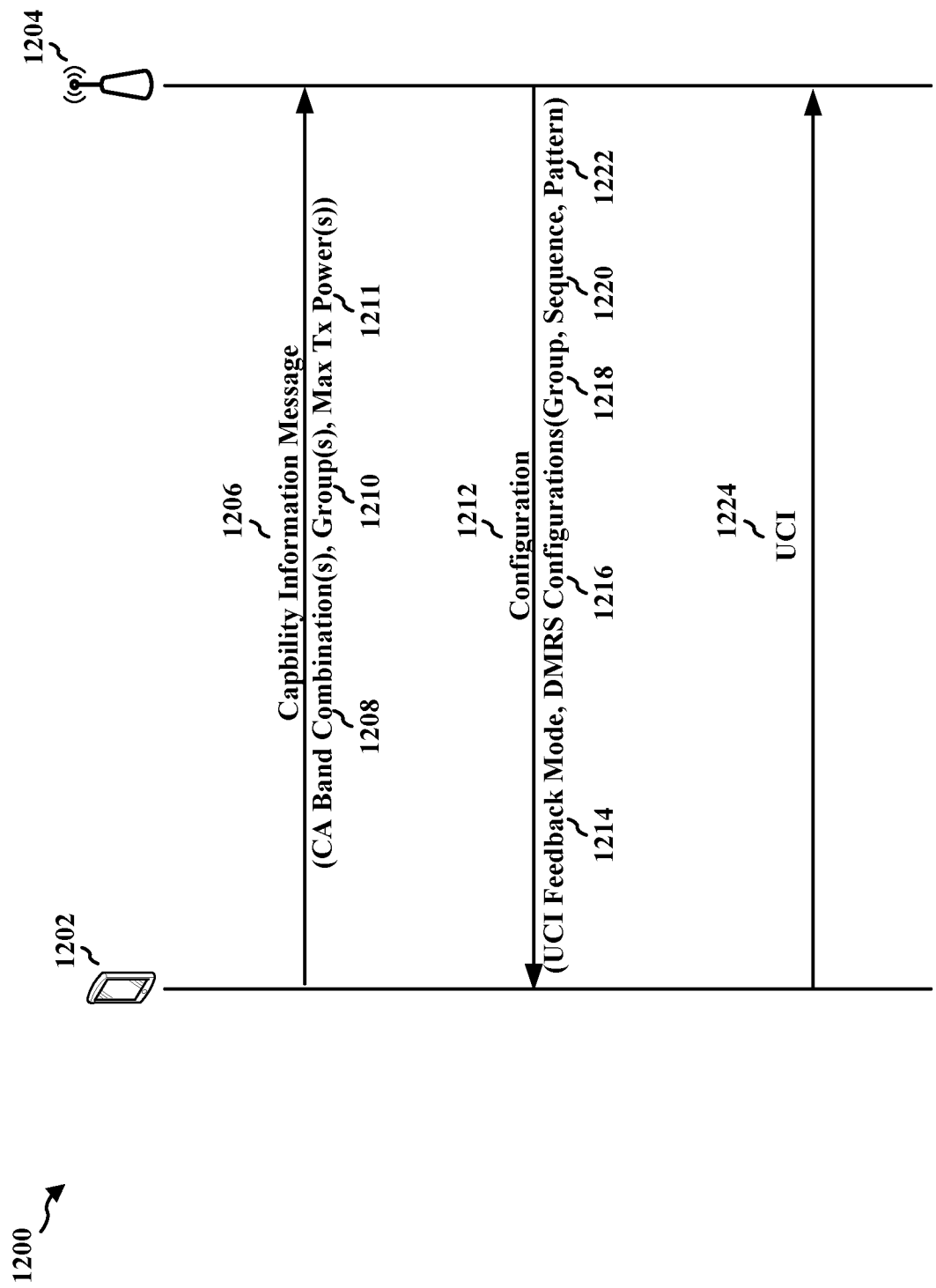
FIG. 12 is a call flow diagram between a UE and a base station.

FIG. 12 is an example 1200 of a call flow diagram between a UE 1202 and a base station 1204. Initially, the UE 1202 may transmit a capability information message 1206 to the base station 1204 indicating support for one or more CA band combinations 1208 in UL inter-band CA. In response to receiving the capability information message identifying a given CA band combination, the base station may determine the carrier groups of different CCs within each band of that CA band combination. In one example, the base station may identify the carrier groups based on a general association of different frequency bands with different PAs, where each CC in a same frequency band is part of a same carrier group. In another example, the base station may identify the carrier groups from additional capability information associated with each supported CA band combination in the capability information message 1206, including one or more groups 1210 of frequency bands which occupy a same carrier group using a same PA. The capability information message 1206 may further indicate a total maximum Tx power 1211 for each of the indicated group(s) 1210 of frequency bands associated with a given CA band combination.

In response to the capability information message 1206, the base station 1204 may transmit a configuration 1212 to the UE 1202 indicating a UCI feedback mode 1214. For instance, if the base station determines from the capability information message 1206 that the UE 1202 supports at least one CA band combination in UL inter-band CA including multiple frequency bands associated with different carrier groups (or PAs), the base station may configure the UCI feedback mode 1214 for those CA band combination(s) such that the UE may account for different carrier groups or PAs, configured maximum output powers, power backoffs, or a combination of the foregoing when determining whether to drop or transmit UCI in a PUCCH or a PUSCH such as described with respect to FIG. 8A, 8B, 9, 10A, 10B, or 11. Otherwise, if the UE 1202 does not support inter-band CA or multiple carrier groups associated with different PAs in inter-band CA, the base station may configure the UCI feedback mode 1214 for whichever CA band combinations the UE does support (or for whichever carrier(s) the UE supports in or out of CA), such that the UE applies conventional UCI multiplexing rules such as described with respect to FIG. 7.

Additionally, if the base station determines from the capability information message 1206 that the UE 1202 supports any of the behaviors described with respect to FIG. 8A, 8B, 9, 10A, 10B, or 11, the base station may indicate in configuration 1212, in one or more different configuration (s), or in a combination of the foregoing, a DMRS configuration 1216 associated with PUSCH transmissions including UCI. For example, DMRS configuration 1216 may indicate a DMRS group 1218, a DMRS sequence 1220, or a DMRS pattern 1222 which the UE may specifically apply to DMRS associated with a PUSCH carrier including UCI. This PUSCH carrier may be, for example, a carrier which the UE selects in response to a significant drop in Tx power for a default PUSCH carrier including UCI, as described with respect to FIG. 11. The DMRS configuration 1216 may also be different than one or more other DMRS configurations which the base station may configure (or pre-configure) for the UE for DMRS in other PUSCH transmissions or carriers not including UCI. In this way, the base station may differentiate PUSCH carriers including UCI from PUSCH carriers lacking UCI in inter-band CA based on the DMRS.

In response to the configuration 1212, the UE 1202 may transmit UCI 1224 to the base station 1204 according to the indicated UCI feedback mode. For example, the UE may transmit UCI 1224 in a PUCCH carrier or PUSCH carrier according to any of the UCI multiplexing rules previously described with respect to FIG. 8A, 8B, 9, 10B, or 11.

Figure 13:
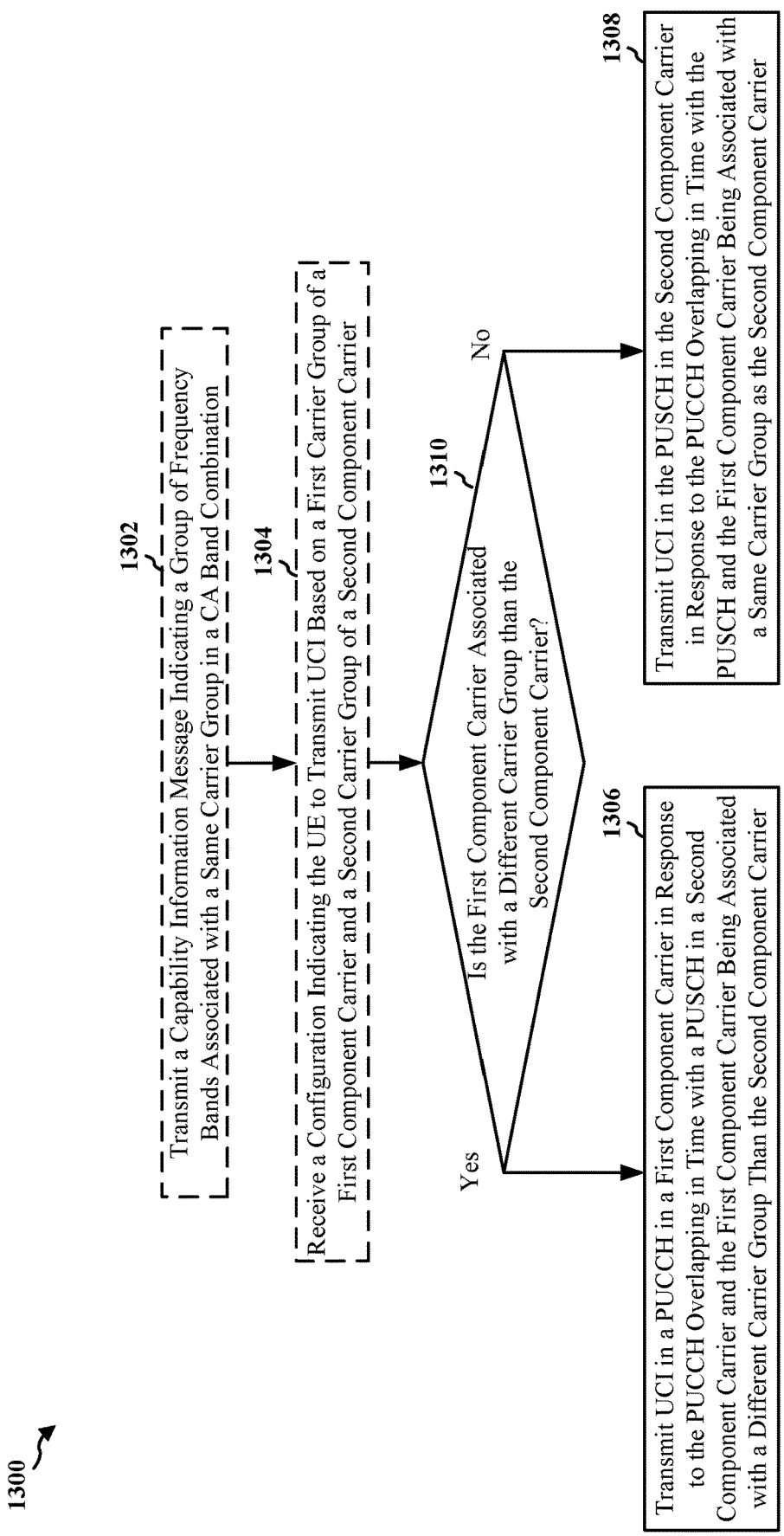
FIG. 13 is a flowchart of a method of wireless communication at a UE.

FIG. 13 is a flowchart 1300 of a method of wireless communication. The method may be performed by a UE (e.g., the UE 104, 350, 1202; the apparatus 1502). Optional aspects are illustrated in dashed lines. The method allows a UE to apply power-efficient UCI multiplexing rules accounting for situations in which the CCs of overlapping PUCCH and PUSCH are in different carrier groups (or associated with different PAs) during inter-band CA, thereby resulting in improved transmission performance.

At 1302, the UE may transmit a capability information message indicating a group of frequency bands associated with a same carrier group in a CA band combination. For example, 1302 may be performed by capability information component 1540. For instance, referring to FIG. 12, the UE 1202 may transmit capability information message 1206 indicating group(s) 1210 of frequency bands associated with a same carrier group (e.g., carriers in carrier groups 808, 858, 1008, 1058 or carriers of carrier groups 810, 860, 1010, 1060) in respective supported CA band combination(s) 1208. For example, if the UE indicates in the message support for CA band combination n1A-n3A-n5A-n7A-n78A, the UE may further indicate that band n1A is associated with one PA (e.g., n1A is in one band group) and that bands n3A, n5A, n7A, and n78A are associated with another PA (e.g., bands n3A, n5A, n7A, and n78A are in another band group). Similarly, in the examples of FIGS. 8A and 8B, the UE may indicate that the frequency band(s) including the carriers 806, 1006 in carrier group 808, 858, 1008, 1058 are within one band group and the frequency band(s) including the carriers 806, 1006 in carrier group 810, 860, 1010, 1060 are in a different band group.

In one example, the capability information message may further indicate a maximum total transmission power associated with the group of frequency bands. For instance, referring to FIG. 12, the capability information message 1206 may also indicate the maximum Tx power 1211 associated with each group 1210 of frequency bands. For example, in the aforementioned CA band combination example (CA band combination n1A-n3A-n5A-n7A-n78A), the UE may additionally indicate that the group including band n1A is associated with a configured maximum output power of 23 dBm, while the group including bands n3A, n5A, n7A, and n78A are associated with another configured maximum output power of 26 dBm. Similarly, in the examples of FIGS. 8A and 8B, the UE may indicate that the frequency band(s) including carrier group 808, 858 are associated with a maximum UL Tx power of 23 dBm while the frequency band(s) including carrier group 810, 860 are associated with a maximum UL Tx power of 26 dBm.

At 1304, the UE may receive a configuration indicating the UE to transmit UCI based on a first carrier group of a first component carrier and a second carrier group of a second component carrier. For example, 1304 may be performed by configuration component 1542. For instance, referring to FIG. 12, the UE 1202 may receive configuration 1212 indicating the UE 1202 to transmit UCI 1224 during inter-band CA based on whether the carriers are within a same or different carrier group (e.g., a same or different frequency band associated with respective PAs). For instance, if the base station determines from the capability information message 1206 that the UE 1202 supports at least one CA band combination in UL inter-band CA including multiple frequency bands associated with different carrier groups (or PAs), the base station may configure the UCI feedback mode 1214 for those CA band combination(s) such that the UE may account for different carrier groups or PAs, configured maximum output powers, power backoffs, or a combination of the foregoing when determining whether to drop or transmit UCI in a PUCCH or a PUSCH such as described with respect to FIG. 8A, 8B, 9, 10A, 10B, or 11. For example, depending on the frequencies of the carriers in indicated frequency bands in a supported CA band combination in capability information message 1206, the base station 1204 may send the UE 1202 a RRC configuration indicating the UE to apply either the UCI multiplexing rule of FIG. 8A (e.g., refrain from performing UCI multiplexing and transmit UCI in the PUCCH), or the UCI multiplexing rule of FIG. 8B (e.g., drop the PUCCH transmission and exclude carriers in a certain frequency band when multiplexing UCI), in response to identifying which frequency bands share the same PA and which frequency bands are associated with different PAs.

At 1306, the UE transmits UCI in a PUCCH in the first component carrier in response to the PUCCH overlapping in time with a PUSCH in the second component carrier, and in response to a condition at 1310 that the first component carrier is associated with a different carrier group than the second component carrier. For example, 1306 may be performed by UCI component 1544. For instance, referring to the aforementioned Figures, the UE 1202 may transmit UCI 914, 1224 in PUCCH 802, 1002 in one of the carriers 806, 1006 in response to the PUCCH 802, 1002 overlapping with one or more PUSCHs 804, 916, 1004 in another one of the carriers 806, 902, 1006, 1102 when the carrier 806, 1006 including PUCCH 802, 1002 and the carrier 806, 902, 1006, 1102 including PUSCH 804, 916, 1004 are in different carrier groups 808, 810, 1008, 1010 such as illustrated and described with respect to FIGS. 8A and 10A. Each carrier group 808, 810, 1008, 1010 may be a group containing one or multiple carriers 806, 902, 1006, 1102 sharing a transmit power using a same PA (e.g., a PA in low band transceiver 402 or a PA in high band transceiver 404). For example, each carrier group may correspond to one or multiple carriers in a same frequency band.

At 1308, the UE transmits UCI in the PUSCH in the second component carrier in response to the PUCCH overlapping in time with the PUSCH, and in response to a condition at 1310 that the first component carrier is associated with a same carrier group as the second component carrier. For example, 1308 may be performed by UCI component 1544. For instance, referring to the aforementioned Figures, the UE 1202 may transmit UCI 914, 1224 in PUSCH 854, 916, 1054 in one of the carriers 856, 902, 1056, 1102 in response to the PUSCH 854, 916, 1054 overlapping with the PUCCH 852, 1052 in another one of the carriers 856, 1056 when the carrier 856, 1056 including PUCCH 852, 1052 and the carrier 856, 902, 1056, 1102 including PUSCH 854, 916, 1054 are in the same carrier group 858, 1058 such as illustrated and described with respect to FIGS. 8B and 10B. Each carrier group 858, 1058 may be a group containing one or multiple carriers 856, 902, 1056, 1102 sharing a transmit power using a same PA (e.g., a PA in low band transceiver 402 or a PA in high band transceiver 404). For example, each carrier group may correspond to one or multiple carriers in a same frequency band.

In one example, the UCI may be transmitted in the PUSCH, and the PUSCH may be associated with a lowest serving cell index among cells including simultaneous PUSCH transmissions. For example, referring to the FIGS. 8B and 12, if the UCI 1224 in PUCCH 852 overlaps with uplink data in one or more PUSCH 854 in the same carrier group 858 as the PUCCH 852 (or associated with the same PA as the PUCCH, notwithstanding whether the PUCCH and PUSCH(s) are in same or different carriers or frequency bands), the UE 1202 may multiplex the UCI 1224 in PUSCH 854 and drop the PUCCH transmission in order to maximize Tx power of the PUSCH. In such case, the PUSCH 854 in which the UCI 1224 is multiplexed may be the PUSCH 854 within carrier group 858 having the lowest serving cell index among other PUSCH in cells with simultaneous PUSCH transmissions.

In one example, the UCI may be transmitted in the PUCCH in the first component carrier further in response to the PUCCH overlapping in time with another PUSCH in a third component carrier associated with the different carrier group than the first component carrier. For example, referring to FIGS. 8A and 12, the UE 1202 may transmit the UCI 1224 in the PUCCH 802 in the carrier 806 of carrier group 808 further in response to the PUCCH 802 overlapping with multiple ones of the PUSCHs 804 in respective ones of the carriers 806 in carrier group 810 (e.g., the PUCCH may overlap with at least two PUSCHs in respective carriers of a different carrier group than that of the PUCCH).

In one example, the UCI may be transmitted in the PUSCH in the second component carrier further in response to the PUCCH overlapping in time with another PUSCH in a third component carrier associated with the different carrier group than the first component carrier. For example, referring to FIGS. 8B and 12, the UE 1202 may transmit the UCI 1224 in the PUSCH 854 in the carrier 856 of carrier group 858 further in response to the PUCCH 852 overlapping with ones of the PUSCHs 854 in a respective one of the carriers 856 in carrier group 860 (e.g., the PUCCH may overlap with a PUSCH in a respective carrier of a different carrier group than that of the PUCCH).

In one example, the first component carrier may be associated with the different carrier group than the second component carrier in response to the first component carrier being in a different frequency band than the second component carrier. In another example, the first component carrier may be associated with the same carrier group as the second component carrier in response to the first component carrier being in a same frequency band as the second component carrier. For instance, referring to the aforementioned Figures, the carriers 806, 856, 1006, 1056 may be associated with carrier groups 808, 810, 858, 860 based on a general association of different frequency bands with different PAs, where each CC in a same frequency band is part of a same carrier group. For example, a carrier including PUCCH in a low frequency band (e.g., handled by low band transceiver 402) may share a first PA with other PUSCH carriers in that low frequency band, while a carrier including PUSCH in a high frequency band (e.g., handled by high band transceiver 404) may share a second PA with other PUCCH or PUSCH carriers in that high frequency band, where the first PA and the second PA are different PAs. Thus, in the examples of FIGS. 8A and 8B, the carriers 806, 856, 1006, 1056 in carrier group 808, 858 may be in one frequency band (e.g., a low band), while the carriers in carrier group 810, 860 may be in another frequency band (e.g., a high band).

In one example, the first component carrier may be associated with the same carrier group as the second component carrier in response to the first component carrier and the second component carrier being in the group of frequency bands indicated in the capability information message transmitted at 1302. For instance, referring to the aforementioned Figures, the carriers 806, 856, 1006, 1056 may be associated with carrier groups 808, 810, 858, 860 based on the indicated one or more groups 1210 of frequency bands or the indicated maximum Tx power 1211 for each indicated group in capability information message 1206, where each CC in an indicated band group or applying a same maximum Tx power is part of a same carrier group sharing use of a same PA. Thus, in the examples of FIGS. 8A and 8B, the carriers 806, 856, 1006, 1056 in carrier group 808, 858 may be part of one indicated band group in a supported CA band combination, while the carriers in carrier group 810, 860 may be part of another indicated band group in the same supported CA band combination.

In one example, the first component carrier may be associated with a first configured maximum output power, and the second component carrier may be associated with a second configured maximum output power. The first configured maximum output power may be a function of a first power backoff, and the second configured maximum output power may be a function of a second power backoff. The first power backoff may be different than the second power backoff. For instance, referring to the aforementioned Figures and Equations (1) and (2), the carrier 806, 856, 902 including PUSCH 804, 854 and the carrier 806, 856 including PUCCH 802, 852 may include different configured maximum output powers 904 (e.g., different $P_{CMAX,f,c}$) calculated at least in part from different power backoffs 906 (e.g., different P-MPRc).

In one example, the UCI may be transmitted in the PUCCH in the first component carrier further in response to the PUCCH overlapping in time with additional PUSCHs in additional component carriers each associated with the different carrier group than the first component carrier. In this example, the UCI may be further transmitted in up to X−1 component carriers including the PUSCH or the additional PUSCHs, where X is a quantity of component carriers having a smallest serving cell index among the second component carrier and the additional component carriers, and X>1. Moreover, the first component carrier may be associated with a configured maximum output power that is smaller than other configured maximum output powers respectively associated with the X−1 component carriers. For instance, referring to FIGS. 10A and 12, the UE 1202 may transmit the UCI 1224 in the PUCCH 1002 in the carrier 1006 of carrier group 1008 in response to the PUCCH 1002 overlapping with multiple ones of the PUSCHs 1004 in respective ones of the carriers 1006 in carrier group 1010 (e.g., the PUCCH may overlap with at least two PUSCHs in respective carriers of a different carrier group than that of the PUCCH). Additionally, the UE 1202 may simultaneously transmit the UCI 1224 in up to X−1 PUSCH carriers having the smallest serving cell index among the PUSCH carriers in the carrier group 1010 including the PUSCHs 1004 (e.g., at most X−1 amount of carriers 1006 including PUSCHs 1004 with the smallest serving cell indices), where X represents a quantity of the carriers 1006 that may transmit UCI. In such case, with further reference to FIG. 9, the carrier 902, 1006 including PUCCH 1002 in carrier group 1008 and the X−1 carriers 902, 1006 including PUSCHs 1004 in carrier group 1010 may be associated with different configured maximum output powers 904, where the configured maximum output power for the PUCCH carrier is smaller than the configured maximum output power for each of the PUSCH carriers (e.g., CC1, CC2, or CC3 in FIG. 9).

In one example, the UCI may be transmitted in the PUSCH in the second component carrier further in response to the PUCCH overlapping in time with additional PUSCHs in additional component carriers each associated with the different carrier group than the first component carrier. In this example, the UCI may be further transmitted in up to X−1 component carriers including the additional PUSCHs, where X is a quantity of component carriers having a smallest serving cell index among the additional component carriers, and X>1. Moreover, the second component carrier may be associated with a configured maximum output power that is smaller than other configured maximum output powers respectively associated with the X−1 component carriers. For instance, referring to FIGS. 10B and 12, the UE 1202 may transmit the UCI 1224 in the PUSCH 1054 in carrier 1056 of carrier group 1058 in response to the PUCCH 1052 overlapping with additional ones of the PUSCHs 1054 in respective carriers 1056 in carrier group 1060 (e.g., the PUCCH may overlap with a PUSCH in respective carriers of a same and different carrier group than that of the PUCCH). Additionally, the UE 1202 may simultaneously transmit the UCI 1224 in up to X−1 PUSCH carriers having the smallest serving cell index among the additional PUSCH carriers in the carrier group 1060 including the PUSCHs 1054 (e.g., at most X−1 amount of carriers 1056 including PUSCHs 1054 with the smallest serving cell indices outside carrier group 1058), where X represents a quantity of the carriers 1056 that may transmit UCI. In such case, with further reference to FIG. 9, the carrier 902, 1056 including the PUSCH 1054 in carrier group 1058 and the X−1 carriers 902, 1056 including the additional PUSCHs 1054 in carrier group 1060 may be associated with different configured maximum output powers 904, where the configured maximum output power for the former PUSCH carrier (e.g., CC1 in FIG. 9) is smaller than the configured maximum output power for each of the latter PUSCH carriers (e.g., CC2 or CC3 in FIG. 9).

In one example, the UCI may be transmitted in the PUSCH in the second component carrier in response to a dropped transmission of the UCI in an additional PUSCH in a third component carrier. The dropped transmission may be in response to a configured maximum output power associated with the third component carrier being reduced by a power backoff by more than a threshold amount of power. For instance, referring to FIGS. 8A, 8B, 10A, 10B, 11 and 12, if an amount of power backoff 1106 for one of the carriers 806, 856, 1006, 1056 of the PUSCH 804, 854, 1004, 1054 initially intended for UCI multiplexing (e.g., CC1 in FIG. 9) exceeds a threshold, or if a ratio of the power backoff 1106 to the configured maximum output power 1104 of this carrier falls below a threshold (e.g., a threshold of 50% for example), then the UE 1202 may drop the transmission of UCI 1224 in this carrier (e.g., CC1 in FIG. 9) and instead transmit the UCI 1224 in a different one of the carriers 806, 856, 1006, 1056 of the PUSCH 804, 854, 1004, 1054 (e.g., CC2 or CC3 in FIG. 9).

In one example, the UCI may be transmitted in the PUSCH in the second component carrier, and the PUCCH may overlap in time with additional PUSCHs in other component carriers. In this example, the PUSCH may include a first DMRS associated with a first DMRS configuration associated with UCI transmission, the first DMRS configuration indicating a first DMRS group, a first DMRS sequence, or a first DMRS pattern. The additional PUSCHs may each include a second DMRS associated with a second DMRS configuration different than the first DMRS configuration. For instance, referring to the aforementioned Figures, the UE 1202 may transmit UCI 1224 in PUSCH 804, 854, 1004, 1054 in one of the carriers 806, 856, 1006, 1056 of a same or different carrier group (e.g., carrier group 808, 810, 858, 860, 1008, 1010, 1058, 1060) than the carrier 806, 856, 1006, 1056 including PUCCH 802, 852, 1002, 1052. The carrier including UCI 1224 may be, for example, a substitute carrier (e.g., CC2 or CC3 in FIG. 9) which the UE applies for UCI following dropping of another carrier initially intended for the UCI transmission (e.g., CC1 in FIG. 9) due to power limitations. To allow the base station 1204 to differentiate the PUSCH carriers including UCI 1224 from those lacking UCI, the UE 1202 may transmit DMRS in the PUSCH 804, 854, 1004, 1054 carrier including UCI 1224 according to the DMRS group 1218, DMRS sequence 1220, or DMRS pattern 1222 indicated in the DMRS configuration 1216 corresponding to UCI 1224. In contrast, for the other PUSCH carriers not including UCI 1224, the UE 1202 may transmit DMRS according to a different DMRS group, different DMRS sequence, or different DMRS pattern indicated in a different DMRS configuration. As an example, the DMRS group, sequence, or pattern for PUSCH carriers lacking UCI may be generated based on Equations (3), (4), or Equation Set (5), respectively, while the other DMRS group, sequence or pattern for PUSCH carriers including UCI may be generated following a modified value, parameter, or equation in Equations (3), (4), or Equation Set (5).

Figure 14:
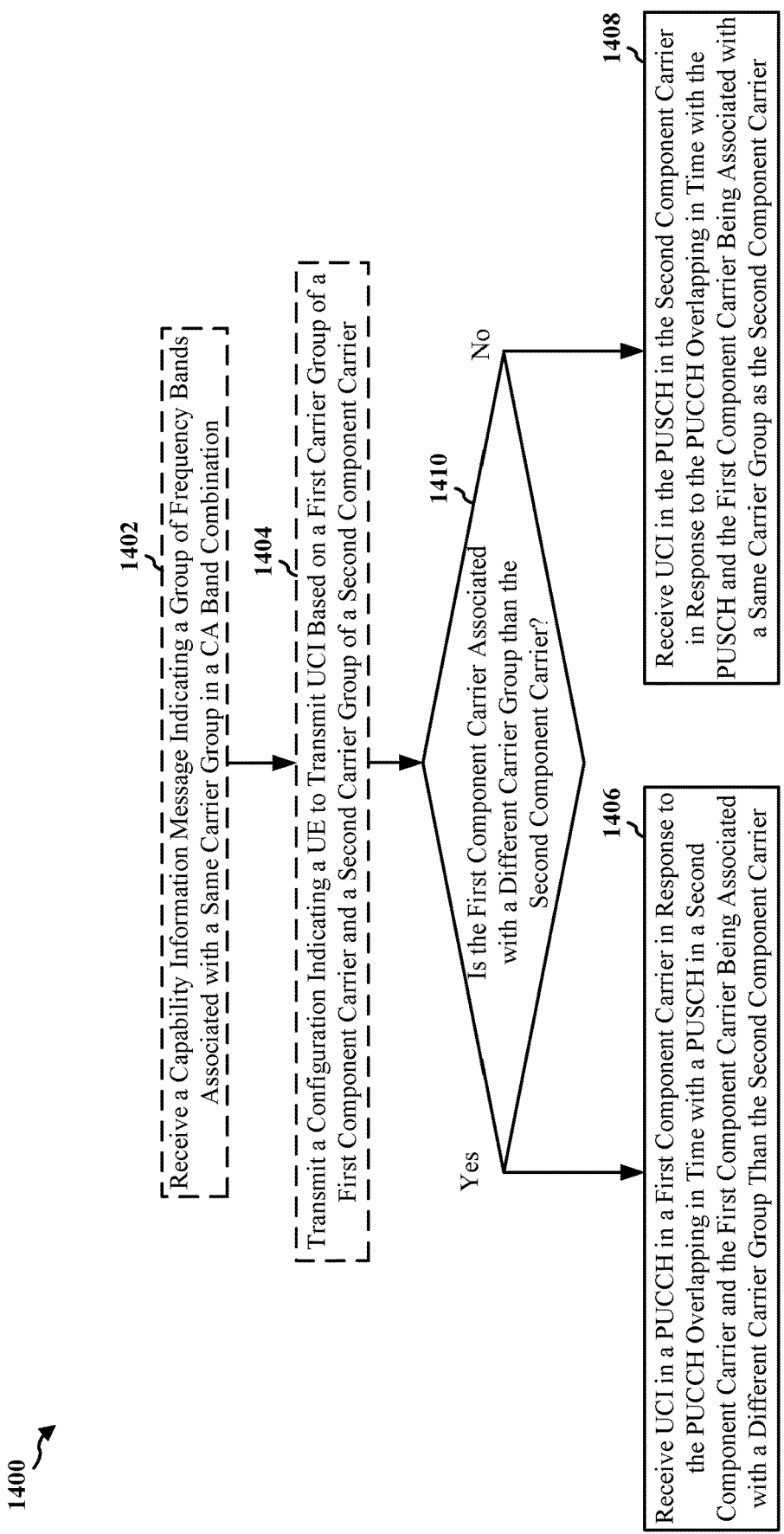
FIG. 14 is a flowchart of a method of wireless communication at a base station.

FIG. 14 is a flowchart 1400 of a method of wireless communication. The method may be performed by a base station (e.g., the base station 102/180, 310, 1204; the apparatus 1602). Optional aspects are illustrated in dashed lines. The method allows a base station to configure power-efficient UCI multiplexing rules accounting for situations in which the CCs of overlapping PUCCH and PUSCH are in different carrier groups (or associated with different PAs) during inter-band CA, thereby resulting in improved UL transmission performance.

At 1402, the base station may receive a capability information message indicating a group of frequency bands associated with a same carrier group in a CA band combination. For example, 1402 may be performed by capability information component 1640. For instance, referring to FIG. 12, the base station 1204 may receive capability information message 1206 indicating group(s) 1210 of frequency bands associated with a same carrier group (e.g., carriers in carrier groups 808, 858, 1008, 1058 or carriers of carrier groups 810, 860, 1010, 1060) in respective supported CA band combination(s) 1208. For example, if the UE indicates in the message support for CA band combination n1A-n3A-n5A-n7A-n78A, the UE may further indicate that band n1A is associated with one PA (e.g., n1A is in one band group) and that bands n3A, n5A, n7A, and n78A are associated with another PA (e.g., bands n3A, n5A, n7A, and n78A are in another band group). Similarly, in the examples of FIGS. 8A and 8B, the UE may indicate that the frequency band(s) including the carriers 806, 1006 in carrier group 808, 858, 1008, 1058 are within one band group and the frequency band(s) including the carriers 806, 1006 in carrier group 810, 860, 1010, 1060 are in a different band group.

In one example, the capability information message may further indicate a maximum total transmission power associated with the group of frequency bands. For instance, referring to FIG. 12, the capability information message 1206 may also indicate the maximum Tx power 1211 associated with each group 1210 of frequency bands. For example, in the aforementioned CA band combination example (CA band combination n1A-n3A-n5A-n7A-n78A), the UE may additionally indicate that the group including band n1A is associated with a configured maximum output power of 23 dBm, while the group including bands n3A, n5A, n7A, and n78A are associated with another configured maximum output power of 26 dBm. Similarly, in the examples of FIGS. 8A and 8B, the UE may indicate that the frequency band(s) including carrier group 808, 858 are associated with a maximum UL Tx power of 23 dBm while the frequency band(s) including carrier group 810, 860 are associated with a maximum UL Tx power of 26 dBm.

At 1404, the base station may transmit a configuration indicating the UE to transmit UCI based on a first carrier group of a first component carrier and a second carrier group of a second component carrier. For example, 1404 may be performed by configuration component 1642. For instance, referring to FIG. 12, the base station 1204 may transmit configuration 1212 indicating the UE 1202 to transmit UCI 1224 during inter-band CA based on whether the carriers are within a same or different carrier group (e.g., a same or different frequency band associated with respective PAs). For instance, if the base station determines from the capability information message 1206 that the UE 1202 supports at least one CA band combination in UL inter-band CA including multiple frequency bands associated with different carrier groups (or PAs), the base station may configure the UCI feedback mode 1214 for those CA band combination(s) such that the UE may account for different carrier groups or PAs, configured maximum output powers, power backoffs, or a combination of the foregoing when determining whether to drop or transmit UCI in a PUCCH or a PUSCH such as described with respect to FIG. 8A, 8B, 9, 10A, 10B, or 11. For example, depending on the frequencies of the carriers in indicated frequency bands in a supported CA band combination in capability information message 1206, the base station 1204 may send the UE 1202 a RRC configuration indicating the UE to apply either the UCI multiplexing rule of FIG. 8A (e.g., refrain from performing UCI multiplexing and transmit UCI in the PUCCH), or the UCI multiplexing rule of FIG. 8B (e.g., drop the PUCCH transmission and exclude carriers in a certain frequency band when multiplexing UCI), in response to identifying which frequency bands share the same PA and which frequency bands are associated with different PAs.

At 1406, the base station receives UCI in a PUCCH in the first component carrier in response to the PUCCH overlapping in time with a PUSCH in the second component carrier, and in response to a condition at 1410 that the first component carrier is associated with a different carrier group than the second component carrier. For example, 1406 may be performed by UCI component 1644. For instance, referring to the aforementioned Figures, the base station 1204 may receive UCI 914, 1224 in PUCCH 802, 1002 in one of the carriers 806, 1006 in response to the PUCCH 802, 1002 overlapping with one or more PUSCHs 804, 916, 1004 in another one of the carriers 806, 902, 1006, 1102 when the carrier 806, 1006 including PUCCH 802, 1002 and the carrier 806, 902, 1006, 1102 including PUSCH 804, 916, 1004 are in different carrier groups 808, 810, 1008, 1010 such as illustrated and described with respect to FIGS. 8A and 10A. Each carrier group 808, 810, 1008, 1010 may be a group containing one or multiple carriers 806, 902, 1006, 1102 sharing a transmit power using a same PA (e.g., a PA in low band transceiver 402 or a PA in high band transceiver 404). For example, each carrier group may correspond to one or multiple carriers in a same frequency band.

At 1408, the base station receives UCI in the PUSCH in the second component carrier in response to the PUCCH overlapping in time with the PUSCH, and in response to a condition at 1410 that the first component carrier is associated with a same carrier group as the second component carrier. For example, 1408 may be performed by UCI component 1644. For instance, referring to the aforementioned Figures, the base station 1204 may receive UCI 914, 1224 in PUSCH 854, 916, 1054 in one of the carriers 856, 902, 1056, 1102 in response to the PUSCH 854, 916, 1054 overlapping with the PUCCH 852, 1052 in another one of the carriers 856, 1056 when the carrier 856, 1056 including PUCCH 852, 1052 and the carrier 856, 902, 1056, 1102 including PUSCH 854, 916, 1054 are in the same carrier group 858, 1058 such as illustrated and described with respect to FIGS. 8B and 10B. Each carrier group 858, 1058 may be a group containing one or multiple carriers 856, 902, 1056, 1102 sharing a transmit power using a same PA (e.g., a PA in low band transceiver 402 or a PA in high band transceiver 404). For example, each carrier group may correspond to one or multiple carriers in a same frequency band.

In one example, the UCI may be received in the PUSCH, and the PUSCH may be associated with a lowest serving cell index among cells including simultaneous PUSCH transmissions. For example, referring to the FIGS. 8B and 12, if the UCI 1224 in PUCCH 852 overlaps with uplink data in one or more PUSCH 854 in the same carrier group 858 as the PUCCH 852 (or associated with the same PA as the PUCCH, notwithstanding whether the PUCCH and PUSCH (s) are in same or different carriers or frequency bands), the base station 1204 may receive the UCI 1224 in PUSCH 854 in response to the UE dropping the PUCCH transmission in order to maximize Tx power of the PUSCH. In such case, the PUSCH 854 in which the UCI 1224 is multiplexed may be the PUSCH 854 within carrier group 858 having the lowest serving cell index among other PUSCH in cells with simultaneous PUSCH transmissions.

In one example, the UCI may be received in the PUCCH in the first component carrier further in response to the PUCCH overlapping in time with another PUSCH in a third component carrier associated with the different carrier group than the first component carrier. For example, referring to FIGS. 8A and 12, the base station 1204 may receive the UCI 1224 in the PUCCH 802 in the carrier 806 of carrier group 808 further in response to the PUCCH 802 overlapping with multiple ones of the PUSCHs 804 in respective ones of the carriers 806 in carrier group 810 (e.g., the PUCCH may overlap with at least two PUSCHs in respective carriers of a different carrier group than that of the PUCCH).

In one example, the UCI may be received in the PUSCH in the second component carrier further in response to the PUCCH overlapping in time with another PUSCH in a third component carrier associated with the different carrier group than the first component carrier. For example, referring to FIGS. 8B and 12, the base station 1204 may receive the UCI 1224 in the PUSCH 854 in the carrier 856 of carrier group 858 further in response to the PUCCH 852 overlapping with ones of the PUSCHs 854 in a respective one of the carriers 856 in carrier group 860 (e.g., the PUCCH may overlap with a PUSCH in a respective carrier of a different carrier group than that of the PUCCH).

In one example, the first component carrier may be associated with the different carrier group than the second component carrier in response to the first component carrier being in a different frequency band than the second component carrier. In another example, the first component carrier may be associated with the same carrier group as the second component carrier in response to the first component carrier being in a same frequency band as the second component carrier. For instance, referring to the aforementioned Figures, the carriers 806, 856, 1006, 1056 may be associated with carrier groups 808, 810, 858, 860 based on a general association of different frequency bands with different PAs, where each CC in a same frequency band is part of a same carrier group. For example, a carrier including PUCCH in a low frequency band (e.g., handled by low band transceiver 402) may share a first PA with other PUSCH carriers in that low frequency band, while a carrier including PUSCH in a high frequency band (e.g., handled by high band transceiver 404) may share a second PA with other PUCCH or PUSCH carriers in that high frequency band, where the first PA and the second PA are different PAs. Thus, in the examples of FIGS. 8A and 8B, the carriers 806, 856, 1006, 1056 in carrier group 808, 858 may be in one frequency band (e.g., a low band), while the carriers in carrier group 810, 860 may be in another frequency band (e.g., a high band).

In one example, the first component carrier may be associated with the same carrier group as the second component carrier in response to the first component carrier and the second component carrier being in the group of frequency bands indicated in the capability information message transmitted at 1402. For instance, referring to the aforementioned Figures, the carriers 806, 856, 1006, 1056 may be associated with carrier groups 808, 810, 858, 860 based on the indicated one or more groups 1210 of frequency bands or the indicated maximum Tx power 1211 for each indicated group in capability information message 1206, where each CC in an indicated band group or applying a same maximum Tx power is part of a same carrier group sharing use of a same PA. Thus, in the examples of FIGS. 8A and 8B, the carriers 806, 856, 1006, 1056 in carrier group 808, 858 may be part of one indicated band group in a supported CA band combination, while the carriers in carrier group 810, 860 may be part of another indicated band group in the same supported CA band combination.

In one example, the first component carrier may be associated with a first configured maximum output power, and the second component carrier may be associated with a second configured maximum output power. The first configured maximum output power may be a function of a first power backoff, and the second configured maximum output power may be a function of a second power backoff. The first power backoff may be different than the second power backoff. For instance, referring to the aforementioned Figures and Equations (1) and (2), the carrier 806, 856, 902 including PUSCH 804, 854 and the carrier 806, 856 including PUCCH 802, 852 may include different configured maximum output powers 904 (e.g., different $P_{CMAX,f,c}$) calculated at least in part from different power backoffs 906 (e.g., different P-MPRc).

In one example, the UCI may be received in the PUCCH in the first component carrier further in response to the PUCCH overlapping in time with additional PUSCHs in additional component carriers each associated with the different carrier group than the first component carrier. In this example, the UCI may be further received in up to X−1 component carriers including the PUSCH or the additional PUSCHs, where X is a quantity of component carriers having a smallest serving cell index among the second component carrier and the additional component carriers, and X>1. Moreover, the first component carrier may be associated with a configured maximum output power that is smaller than other configured maximum output powers respectively associated with the X−1 component carriers. For instance, referring to FIGS. 10A and 12, the base station 1204 may receive the UCI 1224 in the PUCCH 1002 in the carrier 1006 of carrier group 1008 in response to the PUCCH 1002 overlapping with multiple ones of the PUSCHs 1004 in respective ones of the carriers 1006 in carrier group 1010 (e.g., the PUCCH may overlap with at least two PUSCHs in respective carriers of a different carrier group than that of the PUCCH). Additionally, the base station 1204 may simultaneously receive the UCI 1224 in up to X−1 PUSCH carriers having the smallest serving cell index among the PUSCH carriers in the carrier group 1010 including the PUSCHs 1004 (e.g., at most X−1 amount of carriers 1006 including PUSCHs 1004 with the smallest serving cell indices), where X represents a quantity of the carriers 1006 that may transmit UCI. In such case, with further reference to FIG. 9, the carrier 902, 1006 including PUCCH 1002 in carrier group 1008 and the X−1 carriers 902, 1006 including PUSCHs 1004 in carrier group 1010 may be associated with different configured maximum output powers 904, where the configured maximum output power for the PUCCH carrier is smaller than the configured maximum output power for each of the PUSCH carriers (e.g., CC1, CC2, or CC3 in FIG. 9).

In one example, the UCI may be received in the PUSCH in the second component carrier further in response to the PUCCH overlapping in time with additional PUSCHs in additional component carriers each associated with the different carrier group than the first component carrier. In this example, the UCI may be further received in up to X−1 component carriers including the additional PUSCHs, where X is a quantity of component carriers having a smallest serving cell index among the additional component carriers, and X>1. Moreover, the second component carrier may be associated with a configured maximum output power that is smaller than other configured maximum output powers respectively associated with the X−1 component carriers. For instance, referring to FIGS. 10B and 12, the base station 1204 may receive the UCI 1224 in the PUSCH 1054 in carrier 1056 of carrier group 1058 in response to the PUCCH 1052 overlapping with additional ones of the PUSCHs 1054 in respective carriers 1056 in carrier group 1060 (e.g., the PUCCH may overlap with a PUSCH in respective carriers of a same and different carrier group than that of the PUCCH). Additionally, the base station 1204 may simultaneously receive the UCI 1224 in up to X−1 PUSCH carriers having the smallest serving cell index among the additional PUSCH carriers in the carrier group 1060 including the PUSCHs 1054 (e.g., at most X−1 amount of carriers 1056 including PUSCHs 1054 with the smallest serving cell indices outside carrier group 1058), where X represents a quantity of the carriers 1056 that may transmit UCI. In such case, with further reference to FIG. 9, the carrier 902, 1056 including the PUSCH 1054 in carrier group 1058 and the X−1 carriers 902, 1056 including the additional PUSCHs 1054 in carrier group 1060 may be associated with different configured maximum output powers 904, where the configured maximum output power for the former PUSCH carrier (e.g., CC1 in FIG. 9) is smaller than the configured maximum output power for each of the latter PUSCH carriers (e.g., CC2 or CC3 in FIG. 9).

In one example, the UCI may be received in the PUSCH in the second component carrier in response to a dropped transmission of the UCI in an additional PUSCH in a third component carrier. The dropped transmission may be in response to a configured maximum output power associated with the third component carrier being reduced by a power backoff by more than a threshold amount of power. For instance, referring to FIGS. 8A, 8B, 10A, 10B, 11 and 12, if an amount of power backoff 1106 for one of the carriers 806, 856, 1006, 1056 of the PUSCH 804, 854, 1004, 1054 initially intended for UCI multiplexing (e.g., CC1 in FIG. 9)

exceeds a threshold, or if a ratio of the power backoff 1106 to the configured maximum output power 1104 of this carrier falls below a threshold (e.g., a threshold of 50% for example), then the UE 1202 may drop the transmission of UCI 1224 in this carrier (e.g., CC1 in FIG. 9) and instead transmit the UCI 1224 in a different one of the carriers 806, 856, 1006, 1056 of the PUSCH 804, 854, 1004, 1054 (e.g., CC2 or CC3 in FIG. 9). The base station may receive the transmitted UCI accordingly.

In one example, the UCI may be received in the PUSCH in the second component carrier, and the PUCCH may overlap in time with additional PUSCHs in other component carriers. In this example, the PUSCH may include a first DMRS associated with a first DMRS configuration associated with UCI transmission, the first DMRS configuration indicating a first DMRS group, a first DMRS sequence, or a first DMRS pattern. The additional PUSCHs may each include a second DMRS associated with a second DMRS configuration different than the first DMRS configuration. For instance, referring to the aforementioned Figures, the base station 1204 may receive UCI 1224 in PUSCH 804, 854, 1004, 1054 in one of the carriers 806, 856, 1006, 1056 of a same or different carrier group (e.g., carrier group 808, 810, 858, 860, 1008, 1010, 1058, 1060) than the carrier 806, 856, 1006, 1056 including PUCCH 802, 852, 1002, 1052. The carrier including UCI 1224 may be, for example, a substitute carrier (e.g., CC2 or CC3 in FIG. 9) which the UE applies for UCI following dropping of another carrier initially intended for the UCI transmission (e.g., CC1 in FIG. 9) due to power limitations. To allow the base station 1204 to differentiate the PUSCH carriers including UCI 1224 from those lacking UCI, the base station 1204 may receive DMRS in the PUSCH 804, 854, 1004, 1054 carrier including UCI 1224 according to the DMRS group 1218, DMRS sequence 1220, or DMRS pattern 1222 indicated in the DMRS configuration 1216 corresponding to UCI 1224. In contrast, for the other PUSCH carriers not including UCI 1224, the base station 1204 may receive DMRS according to a different DMRS group, different DMRS sequence, or different DMRS pattern indicated in a different DMRS configuration. As an example, the DMRS group, sequence, or pattern for PUSCH carriers lacking UCI may be generated based on Equations (3), (4), or Equation Set (5), respectively, while the other DMRS group, sequence or pattern for PUSCH carriers including UCI may be generated following a modified value, parameter, or equation in Equations (3), (4), or Equation Set (5).

Figure 15:
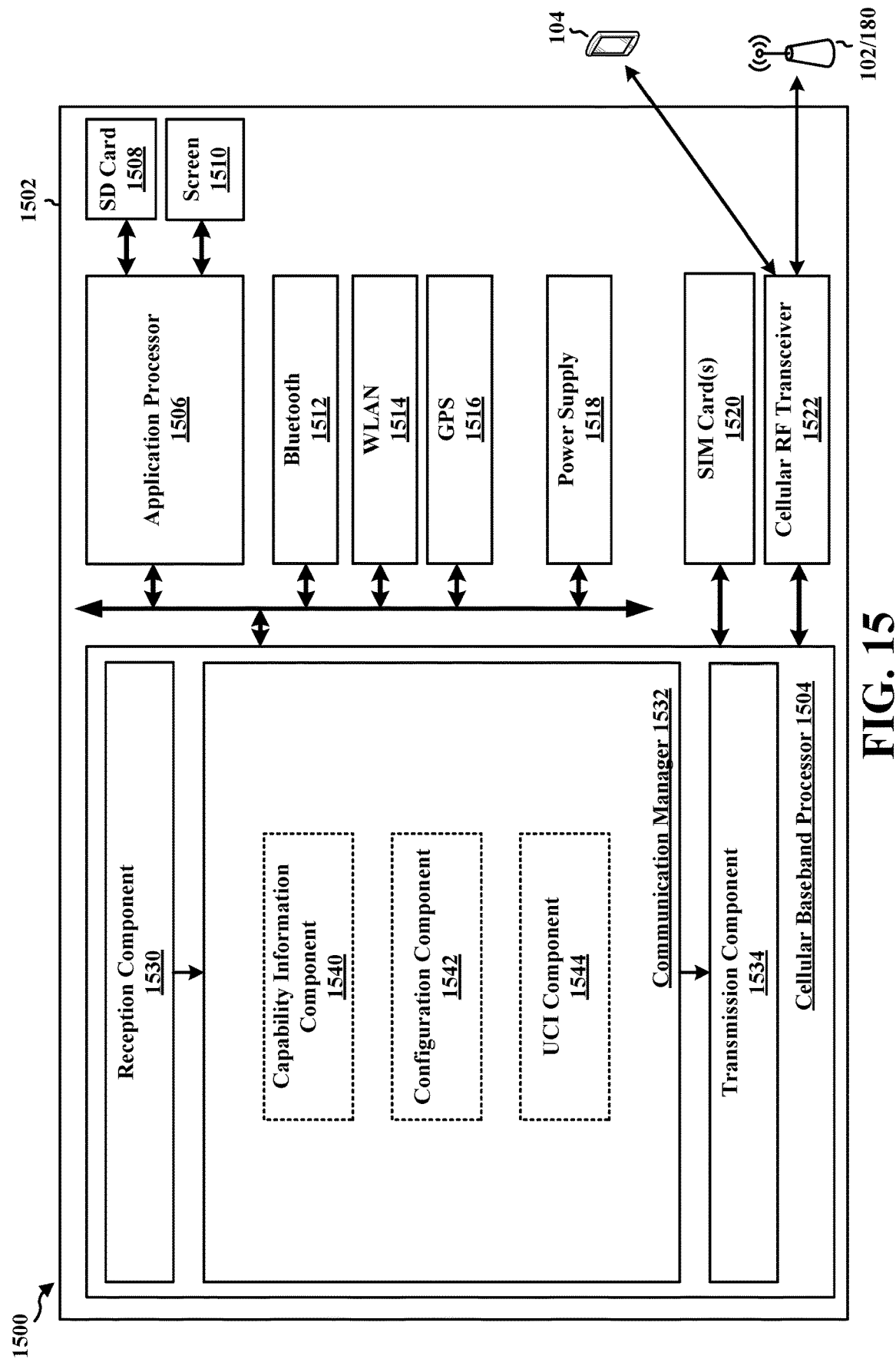
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the aforediscussed additional modules of the apparatus 1502.

The communication manager 1532 includes a capability information component 1540 that is configured to transmit a capability information message indicating a group of frequency bands associated with a same carrier group in a CA band combination, e.g., as described in connection with 1302. In one configuration, the capability information message may further indicate a maximum total transmission power associated with the group of frequency bands.

The communication manager 1532 further includes a configuration component 1542 that is configured to receive a configuration indicating the UE to transmit UCI based on a first carrier group of a first component carrier and a second carrier group of a second component carrier, e.g., as described in connection with 1304.

The communication manager 1532 further includes a UCI component 1544 that is configured to transmit UCI in a PUCCH in the first component carrier in response to the PUCCH overlapping in time with a PUSCH in the second component carrier, and in response to a condition that the first component carrier is associated with a different carrier group than the second component carrier, e.g., as described in connection with 1306 and 1310. The UCI component 1544 is further configured to transmit UCI in the PUSCH in the second component carrier in response to the PUCCH overlapping in time with the PUSCH, and in response to a condition that the first component carrier is associated with a same carrier group as the second component carrier, e.g., as described in connection with 1308 and 1310.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for transmitting uplink control information (UCI) in: a physical uplink control channel (PUCCH) in a first component carrier, or a physical uplink shared channel (PUSCH) in a second component carrier; wherein the UCI is transmitted in: the PUCCH in the first component carrier in response to the PUCCH overlapping in time with the PUSCH and the first component carrier being associated with a different carrier group than the second component carrier; or the PUSCH in the second component carrier in response to the PUCCH overlapping in time with the PUSCH and the first component carrier being associated with a same carrier group as the second component carrier.

In one configuration, the means for transmitting is further configured to transmit a capability information message indicating a group of frequency bands associated with the same carrier group in a carrier aggregation (CA) band combination; wherein the first component carrier is associated with the same carrier group as the second component carrier in response to the first component carrier and the second component carrier being in the group of frequency bands.

In one configuration, the apparatus 1502, and in particular the cellular baseband processor 1504, includes means for receiving a configuration indicating the apparatus to transmit the UCI based on a first carrier group of the first component carrier and a second carrier group of the second component carrier.

In one configuration, the means for transmitting is further configured to transmit the UCI in the PUSCH, and the PUSCH may be associated with a lowest serving cell index among cells including simultaneous PUSCH transmissions. In one configuration, the means for transmitting is further configured to transmit the UCI in the PUCCH in the first component carrier further in response to the PUCCH overlapping in time with another PUSCH in a third component carrier associated with the different carrier group than the first component carrier. In one configuration, the means for transmitting is further configured to transmit the UCI in the PUSCH in the second component carrier further in response to the PUCCH overlapping in time with another PUSCH in a third component carrier associated with the different carrier group than the first component carrier.

In one configuration, the first component carrier may be associated with the different carrier group than the second component carrier in response to the first component carrier being in a different frequency band than the second component carrier. In another configuration, the first component carrier may be associated with the same carrier group as the second component carrier in response to the first component carrier being in a same frequency band as the second component carrier. In one configuration, the first component carrier may be associated with the same carrier group as the second component carrier in response to the first component carrier and the second component carrier being in the group of frequency bands indicated in the capability information message. In one configuration, the first component carrier may be associated with a first configured maximum output power, and the second component carrier may be associated with a second configured maximum output power. The first configured maximum output power may be a function of a first power backoff, and the second configured maximum output power may be a function of a second power backoff. The first power backoff may be different than the second power backoff.

In one configuration, the means for transmitting is further configured to transmit the UCI in the PUCCH in the first component carrier further in response to the PUCCH overlapping in time with additional PUSCHs in additional component carriers each associated with the different carrier group than the first component carrier. In this example, the UCI may be further transmitted in up to X−1 component carriers including the PUSCH or the additional PUSCHs, where X is a quantity of component carriers having a smallest serving cell index among the second component carrier and the additional component carriers, and X>1. Moreover, the first component carrier may be associated with a configured maximum output power that is smaller than other configured maximum output powers respectively associated with the X−1 component carriers. In another configuration, the means for transmitting is further configured to transmit the UCI in the PUSCH in the second component carrier further in response to the PUCCH overlapping in time with additional PUSCHs in additional component carriers each associated with the different carrier group than the first component carrier. In this example, the UCI may be further transmitted in up to X−1 component carriers including the additional PUSCHs, where X is a quantity of component carriers having a smallest serving cell index among the additional component carriers, and X>1. Moreover, the second component carrier may be associated with a configured maximum output power that is smaller than other configured maximum output powers respectively associated with the X−1 component carriers.

In one configuration, the means for transmitting is further configured to transmit the UCI in the PUSCH in the second component carrier in response to a dropped transmission of the UCI in an additional PUSCH in a third component carrier. The dropped transmission may be in response to a configured maximum output power associated with the third component carrier being reduced by a power backoff by more than a threshold amount of power.

In one configuration, the means for transmitting is further configured to transmit the UCI in the PUSCH in the second component carrier, and the PUCCH may overlap in time with additional PUSCHs in other component carriers. In this example, the PUSCH may include a first DMRS associated with a first DMRS configuration associated with UCI transmission, the first DMRS configuration indicating a first DMRS group, a first DMRS sequence, or a first DMRS pattern. The additional PUSCHs may each include a second DMRS associated with a second DMRS configuration different than the first DMRS configuration.

The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
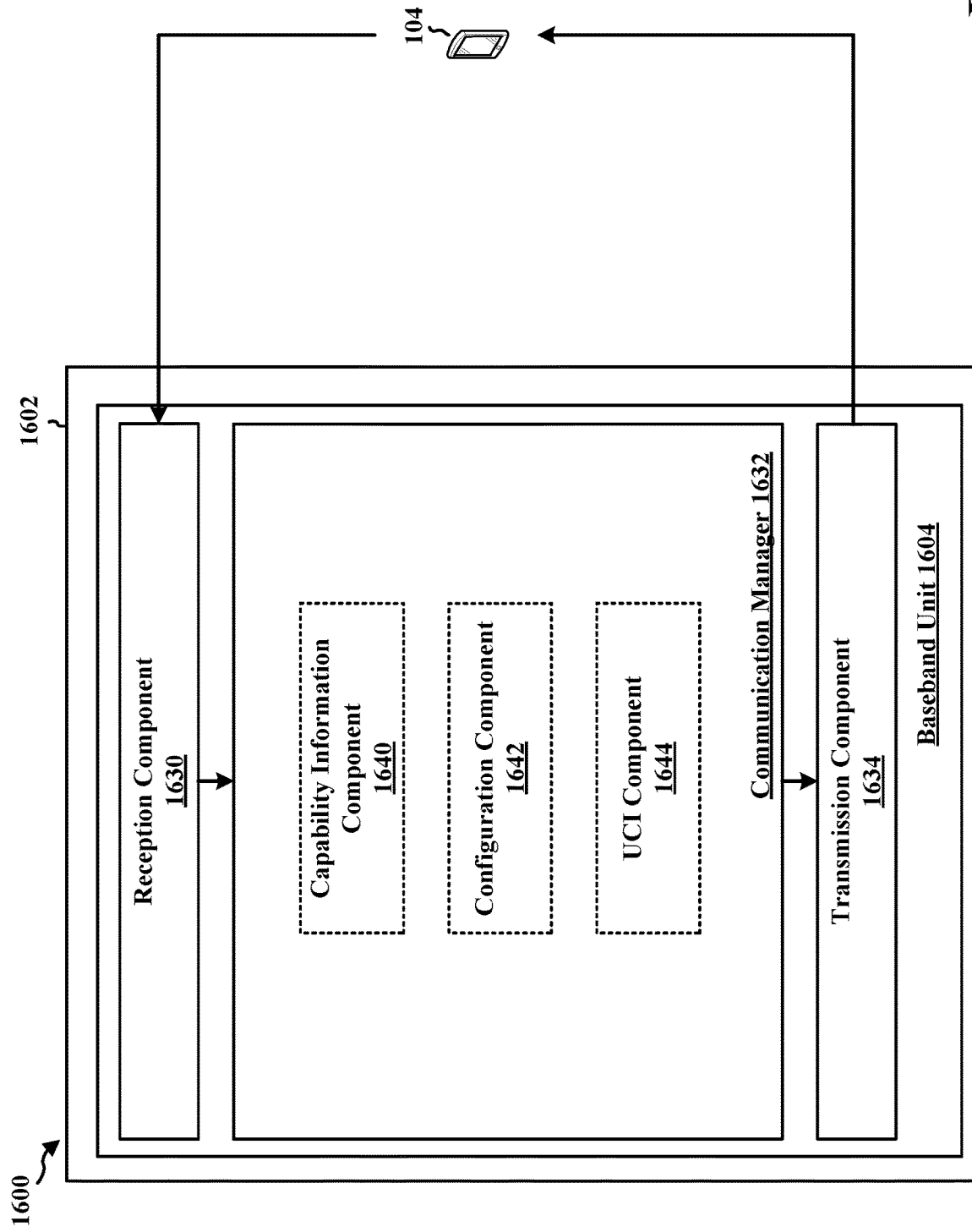
FIG. 16 is a diagram illustrating another example of a hardware implementation for another example apparatus.

FIG. 16 is a diagram 1600 illustrating an example of a hardware implementation for an apparatus 1602. The apparatus 1602 is a BS and includes a baseband unit 1604. The baseband unit 1604 may communicate through a cellular RF transceiver with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the BS 310 and may include the memory 376 and/or at least one of the TX processor 316, the RX processor 370, and the controller/processor 375.

The communication manager 1632 includes a capability information component 1640 that is configured to receive a capability information message indicating a group of frequency bands associated with a same carrier group in a CA band combination, e.g., as described in connection with 1402. In one configuration, the capability information message may further indicate a maximum total transmission power associated with the group of frequency bands.

The communication manager 1632 further includes a configuration component 1642 that is configured to transmit a configuration indicating the UE to transmit UCI based on a first carrier group of a first component carrier and a second carrier group of a second component carrier, e.g., as described in connection with 1404.

The communication manager 1632 further includes a UCI component 1644 that is configured to receive UCI in a PUCCH in the first component carrier in response to the PUCCH overlapping in time with a PUSCH in the second component carrier, and in response to a condition that the first component carrier is associated with a different carrier group than the second component carrier, e.g., as described in connection with 1406 and 1410. The UCI component 1644 is further configured to receive UCI in the PUSCH in the second component carrier in response to the PUCCH overlapping in time with the PUSCH, and in response to a condition that the first component carrier is associated with a same carrier group as the second component carrier, e.g., as described in connection with 1408 and 1410.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for receiving uplink control information (UCI) in: a physical uplink control channel (PUCCH) in a first component carrier, or a physical uplink shared channel (PUSCH) in a second component carrier; wherein the UCI is received in: the PUCCH in the first component carrier in response to the PUCCH overlapping in time with the PUSCH and the first component carrier being associated with a different carrier group than the second component carrier; or the PUSCH in the second component carrier in response to the PUCCH overlapping in time with the PUSCH and the first component carrier being associated with a same carrier group as the second component carrier.

In one configuration, the means for receiving is further configured to transmit a capability information message indicating a group of frequency bands associated with the same carrier group in a carrier aggregation (CA) band combination; wherein the first component carrier is associated with the same carrier group as the second component carrier in response to the first component carrier and the second component carrier being in the group of frequency bands.

In one configuration, the apparatus 1602, and in particular the baseband unit 1604, includes means for transmitting a configuration indicating the apparatus to transmit the UCI based on a first carrier group of the first component carrier and a second carrier group of the second component carrier.

In one configuration, the means for receiving is further configured to receive the UCI in the PUSCH, and the PUSCH may be associated with a lowest serving cell index among cells including simultaneous PUSCH transmissions. In one configuration, the means for receiving is further configured to receive the UCI in the PUCCH in the first component carrier further in response to the PUCCH overlapping in time with another PUSCH in a third component carrier associated with the different carrier group than the first component carrier. In one configuration, the means for receiving is further configured to receive the UCI in the PUSCH in the second component carrier further in response to the PUCCH overlapping in time with another PUS CH in a third component carrier associated with the different carrier group than the first component carrier.

In one configuration, the first component carrier may be associated with the different carrier group than the second component carrier in response to the first component carrier being in a different frequency band than the second component carrier. In another configuration, the first component carrier may be associated with the same carrier group as the second component carrier in response to the first component carrier being in a same frequency band as the second component carrier. In one configuration, the first component carrier may be associated with the same carrier group as the second component carrier in response to the first component carrier and the second component carrier being in the group of frequency bands indicated in the capability information message. In one configuration, the first component carrier may be associated with a first configured maximum output power, and the second component carrier may be associated with a second configured maximum output power. The first configured maximum output power may be a function of a first power backoff, and the second configured maximum output power may be a function of a second power backoff. The first power backoff may be different than the second power backoff.

In one configuration, the means for receiving is further configured to receive the UCI in the PUCCH in the first component carrier further in response to the PUCCH overlapping in time with additional PUSCHs in additional component carriers each associated with the different carrier group than the first component carrier. In this example, the UCI may be further received in up to X−1 component carriers including the PUSCH or the additional PUSCHs, where X is a quantity of component carriers having a smallest serving cell index among the second component carrier and the additional component carriers, and X>1. Moreover, the first component carrier may be associated with a configured maximum output power that is smaller than other configured maximum output powers respectively associated with the X−1 component carriers. In another configuration, the means for receiving is further configured to receive the UCI in the PUSCH in the second component carrier further in response to the PUCCH overlapping in time with additional PUSCHs in additional component carriers each associated with the different carrier group than the first component carrier. In this example, the UCI may be further received in up to X−1 component carriers including the additional PUSCHs, where X is a quantity of component carriers having a smallest serving cell index among the additional component carriers, and X>1. Moreover, the second component carrier may be associated with a configured maximum output power that is smaller than other configured maximum output powers respectively associated with the X−1 component carriers.

In one configuration, the means for receiving is further configured to receive the UCI in the PUSCH in the second component carrier in response to a dropped transmission of the UCI in an additional PUSCH in a third component carrier. The dropped transmission may be in response to a configured maximum output power associated with the third component carrier being reduced by a power backoff by more than a threshold amount of power.

In one configuration, the means for receiving is further configured to receive the UCI in the PUSCH in the second component carrier, and the PUCCH may overlap in time with additional PUSCHs in other component carriers. In this example, the PUSCH may include a first DMRS associated with a first DMRS configuration associated with UCI transmission, the first DMRS configuration indicating a first DMRS group, a first DMRS sequence, or a first DMRS pattern. The additional PUSCHs may each include a second DMRS associated with a second DMRS configuration different than the first DMRS configuration.

The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

UE transmission (Tx) power is a much desired resource in UL carrier aggregation. However, UL Tx power may be limited across UL CCs. For example, UL transmission power may be constrained within a total UL Tx power limit for carrier aggregation. As a result, for inter-band CA, a UE may dynamically apply uplink power aggregation for its CCs across frequency bands. However, even though uplink power aggregation may be realized in inter-band CA for shorter duty cycles notwithstanding the aforementioned power limit, conventional UCI multiplexing rules still take this power limit into account. While the power benefit of such rules is apparent for intra-band CA where the CC(s) including the PUCCH and PUSCH are typically in a same carrier group associated with a same PA, such rules is not efficient for inter-band CA where the CCs including the PUCCH and PUSCH may be in different carrier groups associated with different PAs. Accordingly, the UE may apply different UCI multiplexing rules in inter-band UL CA compared to intra-band CA in order to account for situations in which the CCs of PUCCH and PUSCH are in different carrier groups (or associated with different PAs). As a result, the UE may adjust transmissions of overlapping UCI and uplink data according to power-efficient UCI multiplexing rules based on carrier groups or PA associations for improved performance.

Furthermore, the UE may apply a diversity scheme for UCI transmissions to address any significant power reductions that generally may be applied to a UCI carrier to meet SAR or MPE limits. As a result, additional diversity gain may be achieved with minimized performance degradation as well as improved reliability of UCI feedback. Alternatively, if the power reduction applied to a cell including a UCI carrier happens to be sufficiently large to the point where the transmission power of the UCI in that carrier would be reduced by a threshold amount or ratio resulting in significant degradation of the transmission, the base station may allow or instruct the UE to drop the UCI transmission in that carrier. In such case where the UE drops the UCI transmission in a given PUSCH carrier, the UE may instead multiplex this UCI with uplink data in any other PUSCH carrier in a different cell, and the UE may utilize DMRS to inform the base station as to which PUSCH carrier actually includes the UCI to assist the base station in successfully decoding the PUSCH data. For instance, the UE may indicate the PUSCH carrier in which the UE determines to carry UCI by applying a specific DMRS group to the DMRS in that carrier, a specific DMRS sequence to the DMRS in that carrier, a specific DMRS pattern to the DMRS in that carrier, or a combination of the foregoing. As a result, rather than diversifying UCI for protection against power backoff as previously described, the UE may choose and indicate which carrier to transmit UCI based on different DMRS configurations to protect from significant transmission degradations caused by such power backoff.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is an apparatus for wireless communication, comprising: a processor; memory coupled with the processor; and instructions stored in the memory and operable, when executed by the processor, to cause the apparatus to: transmit uplink control information (UCI) in: a physical uplink control channel (PUCCH) in a first component carrier, or a physical uplink shared channel (PUSCH) in a second component carrier; wherein the UCI is transmitted in: the PUCCH in the first component carrier in response to the PUCCH overlapping in time with the PUSCH and the first component carrier being associated with a different carrier group than the second component carrier; or the PUSCH in the second component carrier in response to the PUCCH overlapping in time with the PUSCH and the first component carrier being associated with a same carrier group as the second component carrier.

Example 2 is the apparatus of Example 1, wherein the instructions, when executed by the processor, cause the apparatus to transmit the UCI in the PUSCH, and the PUSCH is associated with a lowest serving cell index among cells including simultaneous PUSCH transmissions.

Example 3 is the apparatus of Example 1, wherein the instructions, when executed by the processor, cause the apparatus to transmit the UCI in the PUCCH in the first component carrier further in response to the PUCCH overlapping in time with another PUSCH in a third component carrier associated with the different carrier group than the first component carrier.

Example 4 is the apparatus of Example 1, wherein the instructions, when executed by the processor, cause the apparatus to transmit the UCI in the PUSCH in the second component carrier further in response to the PUCCH overlapping in time with another PUSCH in a third component carrier associated with the different carrier group than the first component carrier.

Example 5 is the apparatus of any of Examples 1 to 4, wherein the first component carrier is associated with the different carrier group than the second component carrier in response to the first component carrier being in a different frequency band than the second component carrier.

Example 6 is the apparatus of any of Examples 1 to 4, wherein the first component carrier is associated with the same carrier group as the second component carrier in response to the first component carrier being in a same frequency band as the second component carrier.

Example 7 is the apparatus of any of Examples 1 to 4, wherein the instructions, when executed by the processor, further cause the apparatus to: transmit a capability information message indicating a group of frequency bands associated with the same carrier group in a carrier aggregation (CA) band combination; wherein the first component carrier is associated with the same carrier group as the second component carrier in response to the first component carrier and the second component carrier being in the group of frequency bands.

Example 8 is the apparatus of Example 7, wherein the capability information message further indicates a maximum total transmission power associated with the group of frequency bands.

Example 9 is the apparatus of any of Examples 1 to 8, wherein the instructions, when executed by the processor, further cause the apparatus to: receive a configuration indicating the apparatus to transmit the UCI based on a first carrier group of the first component carrier and a second carrier group of the second component carrier.

Example 10 is the apparatus of any of Examples 1 to 9, wherein the first component carrier is associated with a first configured maximum output power, and the second component carrier is associated with a second configured maximum output power; wherein the first configured maximum output power is a function of a first power backoff, and the second configured maximum output power is a function of a second power backoff; and wherein the first power backoff is different than the second power backoff.

Example 11 is the apparatus of any of Examples 1 to 10, wherein the instructions, when executed by the processor, cause the apparatus to transmit the UCI in the PUCCH in the first component carrier further in response to the PUCCH overlapping in time with additional PUSCHs in additional component carriers each associated with the different carrier group than the first component carrier; wherein the instructions, when executed by the processor, cause the apparatus to further transmit the UCI in up to X−1 component carriers including the PUSCH or the additional PUSCHs, wherein X is a quantity of component carriers having a smallest serving cell index among the second component carrier and the additional component carriers, and X>1; and wherein the first component carrier is associated with a configured maximum output power that is smaller than other configured maximum output powers respectively associated with the X−1 component carriers.

Example 12 is the apparatus of any of Examples 1 to 10, wherein the instructions, when executed by the processor, cause the apparatus to transmit the UCI in the PUSCH in the second component carrier further in response to the PUCCH overlapping in time with additional PUSCHs in additional component carriers each associated with the different carrier group than the first component carrier; wherein the instructions, when executed by the processor, cause the apparatus to further transmit the UCI in up to X−1 component carriers including the additional PUSCHs, wherein X is a quantity of component carriers having a smallest serving cell index among the additional component carriers, and X>1; and wherein the second component carrier is associated with a configured maximum output power that is smaller than other configured maximum output powers respectively associated with the X−1 component carriers.

Example 13 is the apparatus of any of Examples 1 to 12, wherein the instructions, when executed by the processor, cause the apparatus to transmit the UCI in the PUSCH in the second component carrier in response to a dropped transmission of the UCI in an additional PUSCH in a third component carrier; and wherein the dropped transmission is in response to a configured maximum output power associated with the third component carrier being reduced by a power backoff by more than a threshold amount of power.

Example 14 is the apparatus of any of Examples 1 to 13, wherein the instructions, when executed by the processor, cause the apparatus to transmit the UCI in the PUSCH in the second component carrier, and the PUCCH overlaps in time with additional PUSCHs in other component carriers; wherein the PUSCH includes a first DMRS associated with a first DMRS configuration associated with UCI transmission, the first DMRS configuration indicating a first demodulation reference signal (DMRS) group, a first DMRS sequence, or a first DMRS pattern; and wherein the additional PUSCHs each include a second DMRS associated with a second DMRS configuration different than the first DMRS configuration.

Example 15 is an apparatus for wireless communication, comprising: a processor; memory coupled with the processor; and instructions stored in the memory and operable, when executed by the processor, to cause the apparatus to: receive uplink control information (UCI) in: a physical uplink control channel (PUCCH) in a first component carrier, or a physical uplink shared channel (PUSCH) in a second component carrier; wherein the UCI is received in: the PUCCH in the first component carrier in response to the PUCCH overlapping in time with the PUSCH and the first component carrier being associated with a different carrier group than the second component carrier; or the PUSCH in the second component carrier in response to the PUCCH overlapping in time with the PUSCH and the first component carrier being associated with a same carrier group as the second component carrier.

Example 16 is the apparatus of Example 15, wherein the instructions, when executed by the processor, cause the apparatus to receive the UCI in the PUSCH, and the PUSCH is associated with a lowest serving cell index among cells including simultaneous PUSCH transmissions.

Example 17 is the apparatus of Example 15, wherein the instructions, when executed by the processor, cause the apparatus to receive the UCI in the PUCCH in the first component carrier further in response to the PUCCH overlapping in time with another PUSCH in a third component carrier associated with the different carrier group than the first component carrier.

Example 18 is the apparatus of Example 15, wherein the instructions, when executed by the processor, cause the apparatus to receive the UCI in the PUSCH in the second component carrier further in response to the PUCCH overlapping in time with another PUSCH in a third component carrier associated with the different carrier group than the first component carrier.

Example 19 is the apparatus of any of Examples 15 to 18, wherein the first component carrier is associated with the different carrier group than the second component carrier in response to the first component carrier being in a different frequency band than the second component carrier.

Example 20 is the apparatus of any of Examples 15 to 18, wherein the first component carrier is associated with the same carrier group as the second component carrier in response to the first component carrier being in a same frequency band as the second component carrier.

Example 21 is the apparatus of any of Examples 15 to 18, wherein the instructions, when executed by the processor, further cause the apparatus to: receive a capability information message indicating a group of frequency bands associated with the same carrier group in a carrier aggregation (CA) band combination; wherein the first component carrier is associated with the same carrier group as the second component carrier in response to the first component carrier and the second component carrier being in the group of frequency bands.

Example 22 is the apparatus of Example 21, wherein the capability information message further indicates a maximum total transmission power associated with the group of frequency bands.

Example 23 is the apparatus of any of Examples 15 to 22, wherein the instructions, when executed by the processor, further cause the apparatus to: transmit a configuration indicating the UE to transmit the UCI based on a first carrier group of the first component carrier and a second carrier group of the second component carrier.

Example 24 is the apparatus of any of Examples 15 to 23, wherein the first component carrier is associated with a first configured maximum output power, and the second component carrier is associated with a second configured maximum output power; wherein the first configured maximum output power is a function of a first power backoff, and the second configured maximum output power is a function of a second power backoff; and wherein the first power backoff is different than the second power backoff.

Example 25 is the apparatus of any of Examples 15 to 24, wherein the instructions, when executed by the processor, cause the apparatus to receive the UCI in the PUCCH in the first component carrier further in response to the PUCCH overlapping in time with additional PUSCHs in additional component carriers each associated with the different carrier group than the first component carrier; wherein the instructions, when executed by the processor, cause the apparatus to further receive the UCI in up to X−1 component carriers including the PUSCH or the additional PUSCHs, wherein X is a quantity of component carriers having a smallest serving cell index among the second component carrier and the additional component carriers, and X>1; and wherein the first component carrier is associated with a configured maximum output power that is smaller than other configured maximum output powers respectively associated with the X−1 component carriers.

Example 26 is the apparatus of any of Examples 15 to 24, wherein the instructions, when executed by the processor, cause the apparatus to receive the UCI in the PUSCH in the second component carrier further in response to the PUCCH overlapping in time with additional PUSCHs in additional component carriers each associated with the different carrier group than the first component carrier; wherein the instructions, when executed by the processor, cause the apparatus to further receive the UCI in up to X−1 component carriers including the additional PUSCHs, wherein X is a quantity of component carriers having a smallest serving cell index among the additional component carriers, and X>1; and wherein the second component carrier is associated with a configured maximum output power that is smaller than other configured maximum output powers respectively associated with the X−1 component carriers.

Example 27 is the apparatus of any of Examples 15 to 26, wherein the instructions, when executed by the processor, cause the apparatus to receive the UCI in the PUSCH in the second component carrier in response to a dropped transmission of the UCI in an additional PUSCH in a third component carrier; and wherein the dropped transmission is in response to a configured maximum output power associated with the third component carrier being reduced by a power backoff by more than a threshold amount of power.

Example 28 is the apparatus of any of Examples 15 to 27, wherein the instructions, when executed by the processor, cause the apparatus to receive the UCI in the PUSCH in the second component carrier, and the PUCCH overlaps in time with additional PUSCHs in other component carriers; wherein the PUSCH includes a first DMRS associated with a first DMRS configuration associated with UCI transmission, the first DMRS configuration indicating a first demodulation reference signal (DMRS) group, a first DMRS sequence, or a first DMRS pattern; and wherein the additional PUSCHs each include a second DMRS associated with a second DMRS configuration different than the first DMRS configuration.

Example 29 is a method of wireless communication at a user equipment (UE), comprising: transmitting uplink control information (UCI) in: a physical uplink control channel (PUCCH) in a first component carrier, or a physical uplink shared channel (PUSCH) in a second component carrier; wherein the UCI is transmitted in: the PUCCH in the first component carrier in response to the PUCCH overlapping in time with the PUSCH and the first component carrier being associated with a different carrier group than the second component carrier; or the PUSCH in the second component carrier in response to the PUCCH overlapping in time with the PUSCH and the first component carrier being associated with a same carrier group as the second component carrier.

Example 30 is a method of wireless communication at a base station, comprising: receiving uplink control information (UCI) in: a physical uplink control channel (PUCCH) in a first component carrier, or a physical uplink shared channel (PUSCH) in a second component carrier; wherein the UCI is received in: the PUCCH in the first component carrier in response to the PUCCH overlapping in time with the PUSCH and the first component carrier being associated with a different carrier group than the second component carrier; or the PUSCH in the second component carrier in response to the PUCCH overlapping in time with the PUSCH and the first component carrier being associated with a same carrier group as the second component carrier.

What is claimed is:

1. An apparatus for wireless communication, comprising:
   a processor;
   memory coupled with the processor; and
   instructions stored in the memory and operable, when executed by the processor, to cause the apparatus to:
   transmit uplink control information (UCI) in:
      a physical uplink control channel (PUCCH) in a first component carrier, or
      a physical uplink shared channel (PUSCH) in a second component carrier;
   wherein the UCI is transmitted in:
      the PUCCH in the first component carrier in response to the PUCCH overlapping in time with the PUSCH and the first component carrier being associated with a different carrier group including a different power class than the second component carrier; or
      the PUSCH in the second component carrier in response to the PUCCH overlapping in time with the PUSCH and the first component carrier being associated with a same carrier group including a same power class as the second component carrier.

2. The apparatus of claim 1, wherein the instructions, when executed by the processor, cause the apparatus to transmit the UCI in the PUSCH, and the PUSCH is associated with a lowest serving cell index among cells including simultaneous PUSCH transmissions.

3. The apparatus of claim 1, wherein the instructions, when executed by the processor, cause the apparatus to transmit the UCI in the PUCCH in the first component carrier further in response to the PUCCH overlapping in time with another PUSCH in a third component carrier associated with the different carrier group than the first component carrier.

4. The apparatus of claim 1, wherein the instructions, when executed by the processor, cause the apparatus to transmit the UCI in the PUSCH in the second component carrier further in response to the PUCCH overlapping in time with another PUSCH in a third component carrier associated with the different carrier group than the first component carrier.

5. The apparatus of claim 1, wherein the first component carrier is associated with the different carrier group than the second component carrier in response to the first component carrier being in a different frequency band than the second component carrier.

6. The apparatus of claim 1, wherein the first component carrier is associated with the same carrier group as the second component carrier in response to the first component carrier being in a same frequency band as the second component carrier.

7. The apparatus of claim 1, wherein the instructions, when executed by the processor, further cause the apparatus to:
   transmit a capability information message indicating a group of frequency bands associated with the same carrier group in a carrier aggregation (CA) band combination;
   wherein the first component carrier is associated with the same carrier group as the second component carrier in response to the first component carrier and the second component carrier being in the group of frequency bands.

8. The apparatus of claim 7, wherein the capability information message further indicates a maximum total transmission power associated with the group of frequency bands.

9. The apparatus of claim 1, wherein the instructions, when executed by the processor, further cause the apparatus to:
   receive a configuration indicating the apparatus to transmit the UCI based on a first carrier group of the first component carrier and a second carrier group of the second component carrier.

10. The apparatus of claim 1,
   wherein the first component carrier is associated with a first configured maximum output power, and the second component carrier is associated with a second configured maximum output power;
   wherein the first configured maximum output power is a function of a first power backoff, and the second configured maximum output power is a function of a second power backoff; and
   wherein the first power backoff is different than the second power backoff.

11. The apparatus of claim 1,
   wherein the instructions, when executed by the processor, cause the apparatus to transmit the UCI in the PUCCH in the first component carrier further in response to the PUCCH overlapping in time with additional PUSCHs in additional component carriers each associated with the different carrier group than the first component carrier;
   wherein the instructions, when executed by the processor, cause the apparatus to further transmit the UCI in up to X−1 component carriers including the PUSCH or the additional PUSCHs, wherein X is a quantity of component carriers having a smallest serving cell index among the second component carrier and the additional component carriers, and X>1; and
   wherein the first component carrier is associated with a configured maximum output power that is smaller than other configured maximum output powers respectively associated with the X−1 component carriers.

12. The apparatus of claim 1,
wherein the instructions, when executed by the processor, cause the apparatus to transmit the UCI in the PUSCH in the second component carrier further in response to the PUCCH overlapping in time with additional PUSCHs in additional component carriers each associated with the different carrier group than the first component carrier;
wherein the instructions, when executed by the processor, cause the apparatus to further transmit the UCI in up to X−1 component carriers including the additional PUSCHs, wherein X is a quantity of component carriers having a smallest serving cell index among the additional component carriers, and X>1; and
wherein the second component carrier is associated with a configured maximum output power that is smaller than other configured maximum output powers respectively associated with the X−1 component carriers.

13. The apparatus of claim 1,
wherein the instructions, when executed by the processor, cause the apparatus to transmit the UCI in the PUSCH in the second component carrier in response to a dropped transmission of the UCI in an additional PUSCH in a third component carrier; and
wherein the dropped transmission is in response to a configured maximum output power associated with the third component carrier being reduced by a power backoff by more than a threshold amount of power.

14. The apparatus of claim 1,
wherein the instructions, when executed by the processor, cause the apparatus to transmit the UCI in the PUSCH in the second component carrier, and the PUCCH overlaps in time with additional PUSCHs in other component carriers;
wherein the PUSCH includes a first DMRS associated with a first DMRS configuration associated with UCI transmission, the first DMRS configuration indicating a first demodulation reference signal (DMRS) group, a first DMRS sequence, or a first DMRS pattern; and
wherein the additional PUSCHs each include a second DMRS associated with a second DMRS configuration different than the first DMRS configuration.

15. An apparatus for wireless communication, comprising:
a processor;
memory coupled with the processor; and
instructions stored in the memory and operable, when executed by the processor, to cause the apparatus to:
receive uplink control information (UCI) in:
a physical uplink control channel (PUCCH) in a first component carrier, or
a physical uplink shared channel (PUSCH) in a second component carrier;
wherein the UCI is received in:
the PUCCH in the first component carrier in response to the PUCCH overlapping in time with the PUSCH and the first component carrier being associated with a different carrier group including a different power class than the second component carrier; or
the PUSCH in the second component carrier in response to the PUCCH overlapping in time with the PUSCH and the first component carrier being associated with a same carrier group including a same power class as the second component carrier.

16. The apparatus of claim 15, wherein the instructions, when executed by the processor, cause the apparatus to receive the UCI in the PUSCH, and the PUSCH is associated with a lowest serving cell index among cells including simultaneous PUSCH transmissions.

17. The apparatus of claim 15, wherein the instructions, when executed by the processor, cause the apparatus to receive the UCI in the PUCCH in the first component carrier further in response to the PUCCH overlapping in time with another PUSCH in a third component carrier associated with the different carrier group than the first component carrier.

18. The apparatus of claim 15, wherein the instructions, when executed by the processor, cause the apparatus to receive the UCI in the PUSCH in the second component carrier further in response to the PUCCH overlapping in time with another PUSCH in a third component carrier associated with the different carrier group than the first component carrier.

19. The apparatus of claim 15, wherein the first component carrier is associated with the different carrier group than the second component carrier in response to the first component carrier being in a different frequency band than the second component carrier.

20. The apparatus of claim 15, wherein the first component carrier is associated with the same carrier group as the second component carrier in response to the first component carrier being in a same frequency band as the second component carrier.

21. The apparatus of claim 15, wherein the instructions, when executed by the processor, further cause the apparatus to:
receive a capability information message indicating a group of frequency bands associated with the same carrier group in a carrier aggregation (CA) band combination;
wherein the first component carrier is associated with the same carrier group as the second component carrier in response to the first component carrier and the second component carrier being in the group of frequency bands.

22. The apparatus of claim 21, wherein the capability information message further indicates a maximum total transmission power associated with the group of frequency bands.

23. The apparatus of claim 15, wherein the instructions, when executed by the processor, further cause the apparatus to:
transmit a configuration indicating a user equipment (UE) to transmit the UCI based on a first carrier group of the first component carrier and a second carrier group of the second component carrier.

24. The apparatus of claim 15,
wherein the first component carrier is associated with a first configured maximum output power, and the second component carrier is associated with a second configured maximum output power;
wherein the first configured maximum output power is a function of a first power backoff, and the second configured maximum output power is a function of a second power backoff; and
wherein the first power backoff is different than the second power backoff.

25. The apparatus of claim 15,
wherein the instructions, when executed by the processor, cause the apparatus to receive the UCI in the PUCCH in the first component carrier further in response to the PUCCH overlapping in time with additional PUSCHs in additional component carriers each associated with the different carrier group than the first component carrier;
wherein the instructions, when executed by the processor, cause the apparatus to further receive the UCI in up to X−1 component carriers including the PUSCH or the additional PUSCHs, wherein X is a quantity of component carriers having a smallest serving cell index among the second component carrier and the additional component carriers, and X>1; and
wherein the first component carrier is associated with a configured maximum output power that is smaller than other configured maximum output powers respectively associated with the X−1 component carriers.

26. The apparatus of claim 15,
wherein the instructions, when executed by the processor, cause the apparatus to receive the UCI in the PUSCH in the second component carrier further in response to the PUCCH overlapping in time with additional PUSCHs in additional component carriers each associated with the different carrier group than the first component carrier;
wherein the instructions, when executed by the processor, cause the apparatus to further receive the UCI in up to X−1 component carriers including the additional PUSCHs, wherein X is a quantity of component carriers having a smallest serving cell index among the additional component carriers, and X>1; and
wherein the second component carrier is associated with a configured maximum output power that is smaller than other configured maximum output powers respectively associated with the X−1 component carriers.

27. The apparatus of claim 15,
wherein the instructions, when executed by the processor, cause the apparatus to receive the UCI in the PUSCH in the second component carrier in response to a dropped transmission of the UCI in an additional PUSCH in a third component carrier; and
wherein the dropped transmission is in response to a configured maximum output power associated with the third component carrier being reduced by a power backoff by more than a threshold amount of power.

28. The apparatus of claim 15,
wherein the instructions, when executed by the processor, cause the apparatus to receive the UCI in the PUSCH in the second component carrier, and the PUCCH overlaps in time with additional PUSCHs in other component carriers;

wherein the PUSCH includes a first DMRS associated with a first DMRS configuration associated with UCI transmission, the first DMRS configuration indicating a first demodulation reference signal (DMRS) group, a first DMRS sequence, or a first DMRS pattern; and
wherein the additional PUSCHs each include a second DMRS associated with a second DMRS configuration different than the first DMRS configuration.

29. A method of wireless communication at a user equipment (UE), comprising:
transmitting uplink control information (UCI) in:
a physical uplink control channel (PUCCH) in a first component carrier, or
a physical uplink shared channel (PUSCH) in a second component carrier;
wherein the UCI is transmitted in:
the PUCCH in the first component carrier in response to the PUCCH overlapping in time with the PUSCH and the first component carrier being associated with a different carrier group including a different power class than the second component carrier; or
the PUSCH in the second component carrier in response to the PUCCH overlapping in time with the PUSCH and the first component carrier being associated with a same carrier group including a same power class as the second component carrier.

30. A method of wireless communication at a base station, comprising:
receiving uplink control information (UCI) in:
a physical uplink control channel (PUCCH) in a first component carrier, or
a physical uplink shared channel (PUSCH) in a second component carrier;
wherein the UCI is received in:
the PUCCH in the first component carrier in response to the PUCCH overlapping in time with the PUSCH and the first component carrier being associated with a different carrier group including a different power class than the second component carrier; or
the PUSCH in the second component carrier in response to the PUCCH overlapping in time with the PUSCH and the first component carrier being associated with a same carrier group including a same power class as the second component carrier.

* * * * *